United States Patent [19]

Hayashi et al.

[11] Patent Number: 4,976,170
[45] Date of Patent: Dec. 11, 1990

[54] METHOD FOR CONTROLLING STEPLESS AUTOMATIC TRANSMISSION AND APPARATUS THEREFOR

[75] Inventors: Kiyotaka Hayashi; Etsumi Handa; Yorihisa Yamamoto; Hiroshi Tanaka, all of Saitama, Japan

[73] Assignee: Honda Giken Kabushiki Kaisha, Tokyo, Japan

[21] Appl. No.: 230,840

[22] Filed: Aug. 10, 1988

[30] Foreign Application Priority Data

Aug. 11, 1987 [JP] Japan .................................. 62-200582

[51] Int. Cl.$^5$ .............................................. B60K 41/12
[52] U.S. Cl. ......................................... 74/866; 74/867
[58] Field of Search ................... 74/861, 865, 866, 877

[56] References Cited

U.S. PATENT DOCUMENTS

| | | | |
|---|---|---|---|
| 4,493,228 | 1/1985 | Vukovich | 74/858 |
| 4,543,077 | 9/1985 | Yamamuro et al. | 474/12 |
| 4,589,302 | 5/1986 | Oda et al. | 74/877 |
| 4,594,916 | 6/1986 | Ito | 74/866 |
| 4,627,311 | 12/1986 | Yokooku | 74/866 |
| 4,671,138 | 6/1987 | Nobumoto et al. | 74/862 |
| 4,680,990 | 7/1987 | Ohgami | 74/877 X |
| 4,689,745 | 8/1987 | Itoh et al. | 74/866 X |
| 4,701,953 | 10/1987 | Osanai | 74/866 X |
| 4,704,683 | 11/1987 | Osanai | 364/424.1 |
| 4,716,791 | 1/1988 | Ohzono | 74/687 |
| 4,727,711 | 3/1988 | Niwa et al. | 74/866 |
| 4,730,522 | 3/1988 | Morimoto | 74/866 X |
| 4,747,807 | 5/1988 | Nakamura et al. | 474/28 |
| 4,753,133 | 6/1988 | Itoh et al. | 74/866 |
| 4,759,236 | 7/1988 | Tezuka et al. | 74/866 |
| 4,767,382 | 8/1988 | Tezuka | 474/28 |
| 4,833,944 | 5/1989 | Tanaka | 74/866 |

FOREIGN PATENT DOCUMENTS 0093312 12/1983 European Pat. Off. .
0168540 1/1986 European Pat. Off. .
58-39870 3/1983 Japan .

Primary Examiner—Dwight Diehl
Attorney, Agent, or Firm—Lyon & Lyon

[57] ABSTRACT

A method for controlling a stepless automatic transmission of a vehicle and an apparatus therefore automatically control the transmission ratio according to the change with respect to time of a throttle aperture and a driving condition of the vehicle. A change with respect to time of the throttle aperture is taken into account in determining the objective engine speed and the transmission ratio. An apparatus includes a throttle sensor for sensing a change with respect to time of the throttle aperture, a first allocator for allocating an objective engine speed in a condition that the change with respect to time of the throttle aperture is within a prescribed range, a second allocator for allocating an objective engine speed in a condition that the throttle aperture is opened more rapidly than a first prescribed value, a third allocator for allocating an objective engine speed in a condition that the throttle aperture is closed more rapidly than a second prescribed value, and a transmission controller for controlling a transmission ratio of the stepless automatic transmission so that an actual engine speed coincides with the objective engine speed. A method includes the steps of sensing a change with respect to time of a throttle aperture, allocating an objective engine speed according to the change with respect to time of the throttle aperture, and controlling a transmission ratio of the stepless automatic transmission so that an actual engine speed coincides with the objective engine speed.

4 Claims, 20 Drawing Sheets

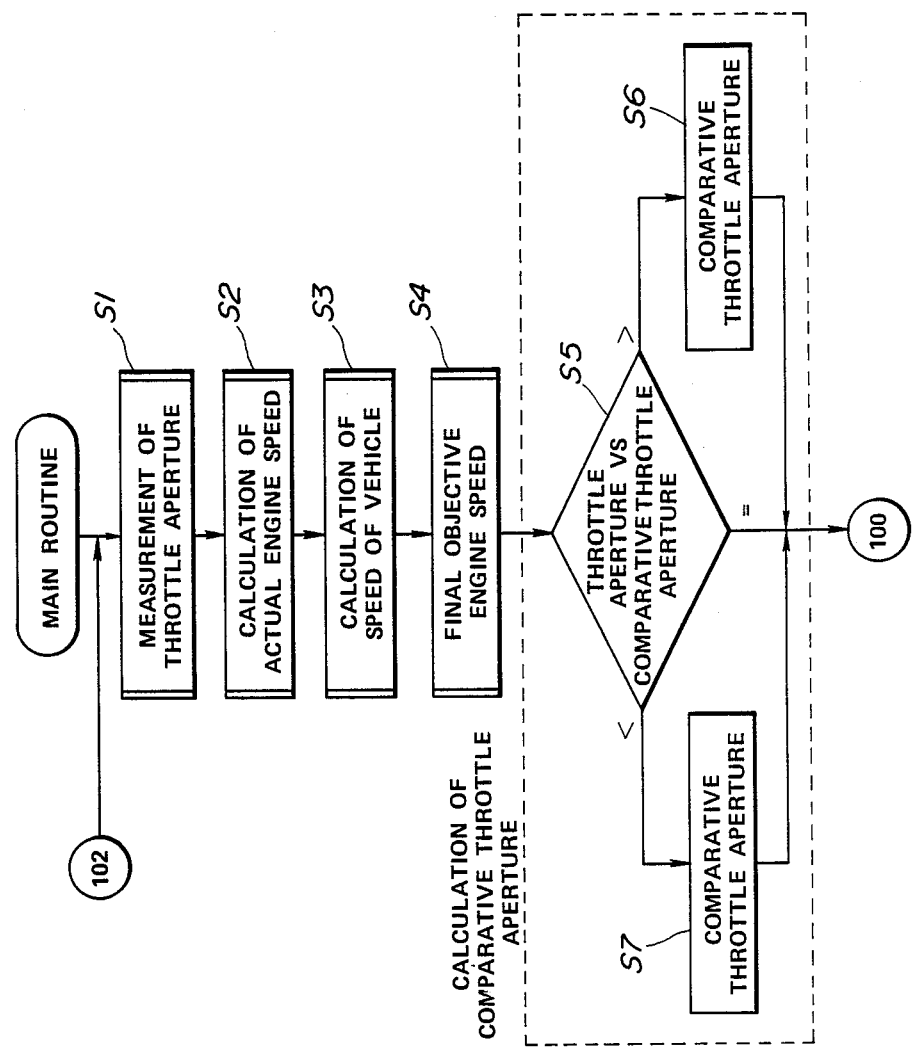

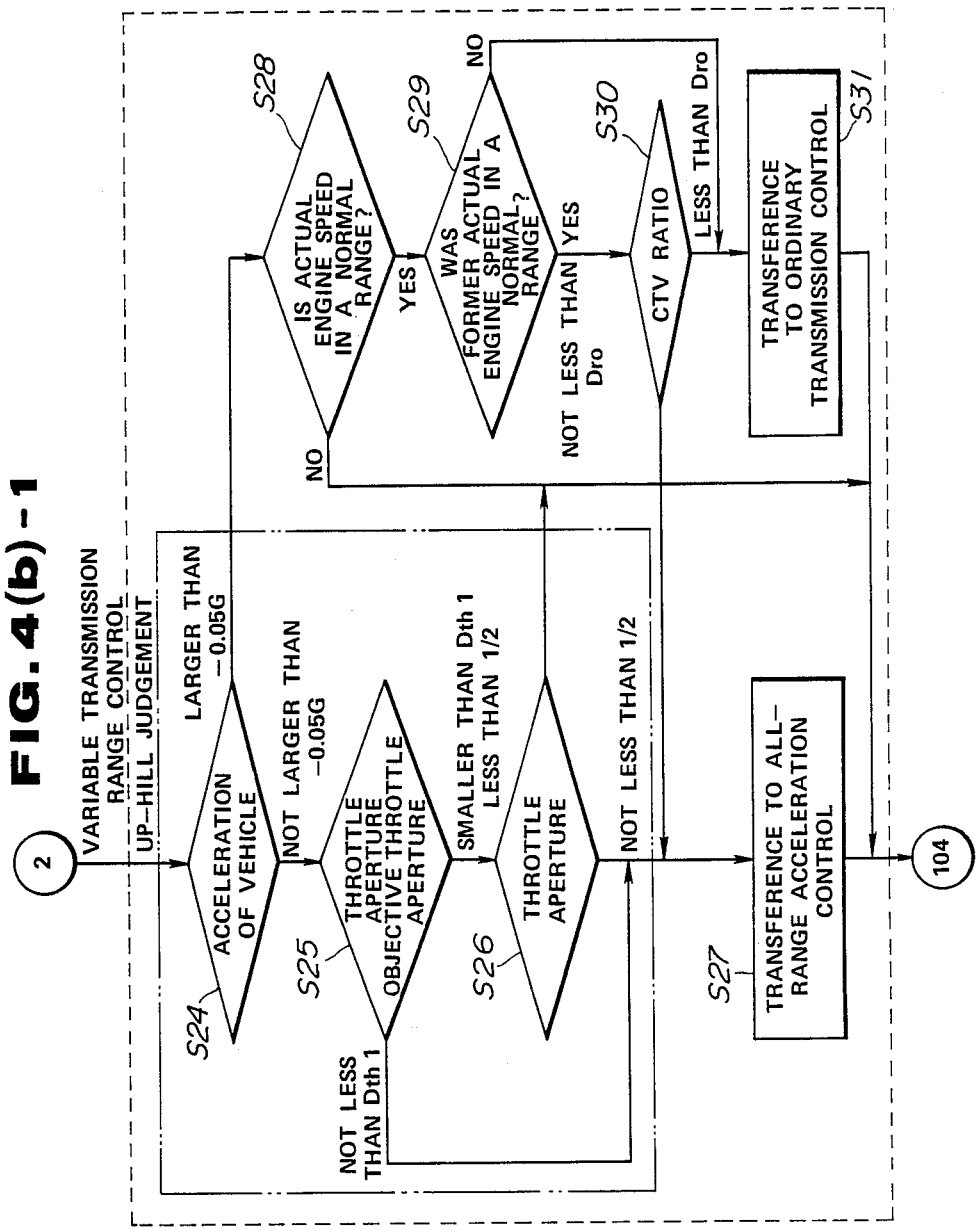

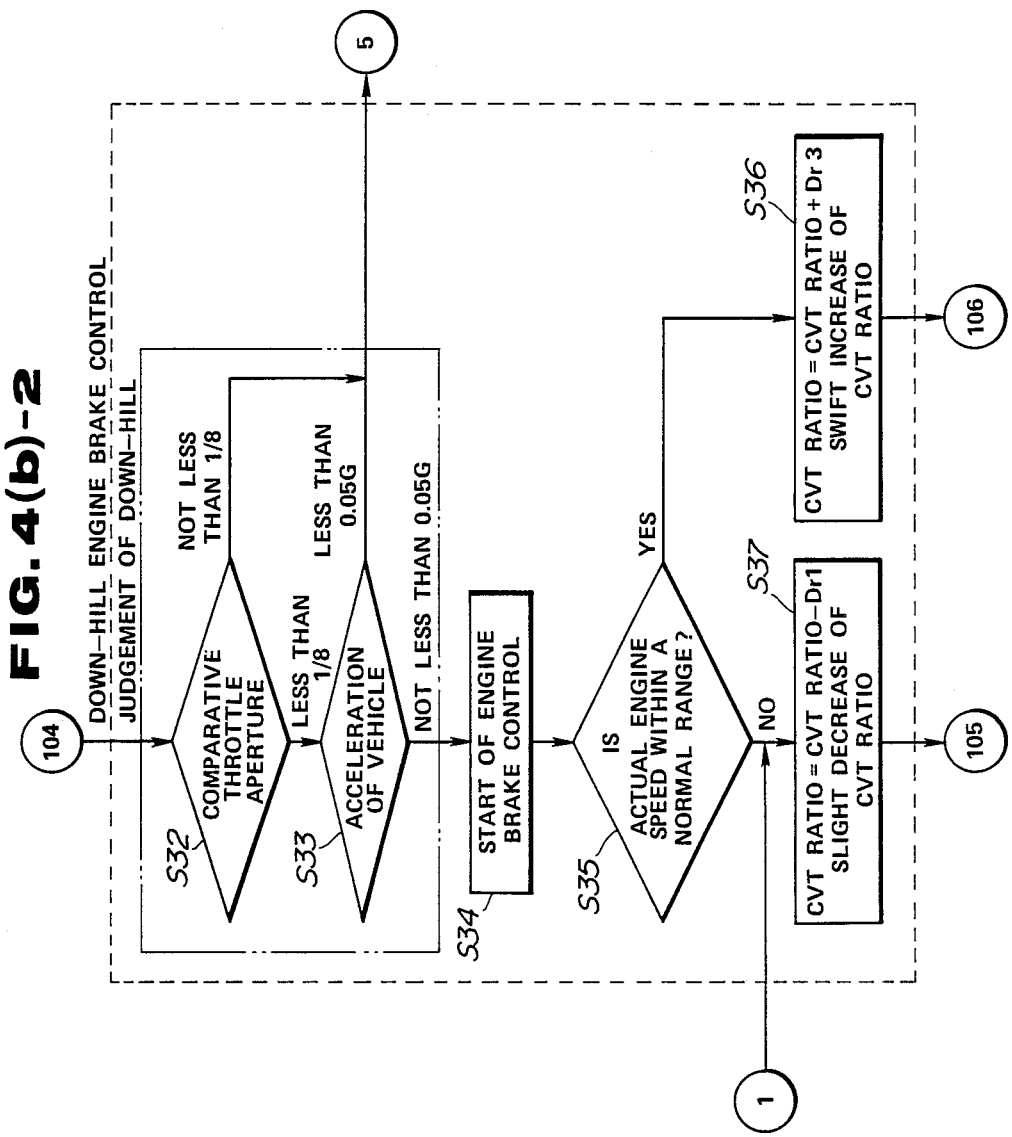

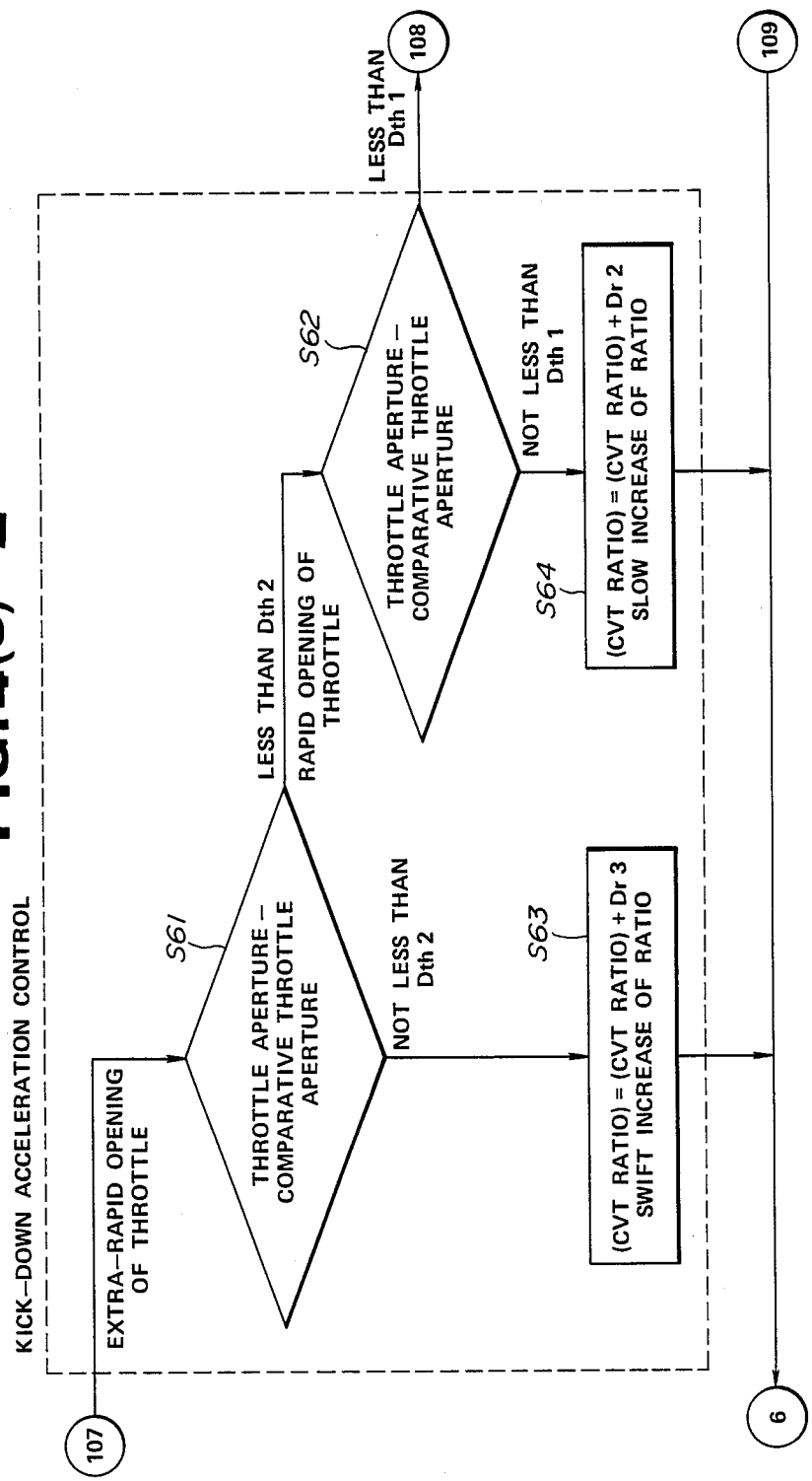

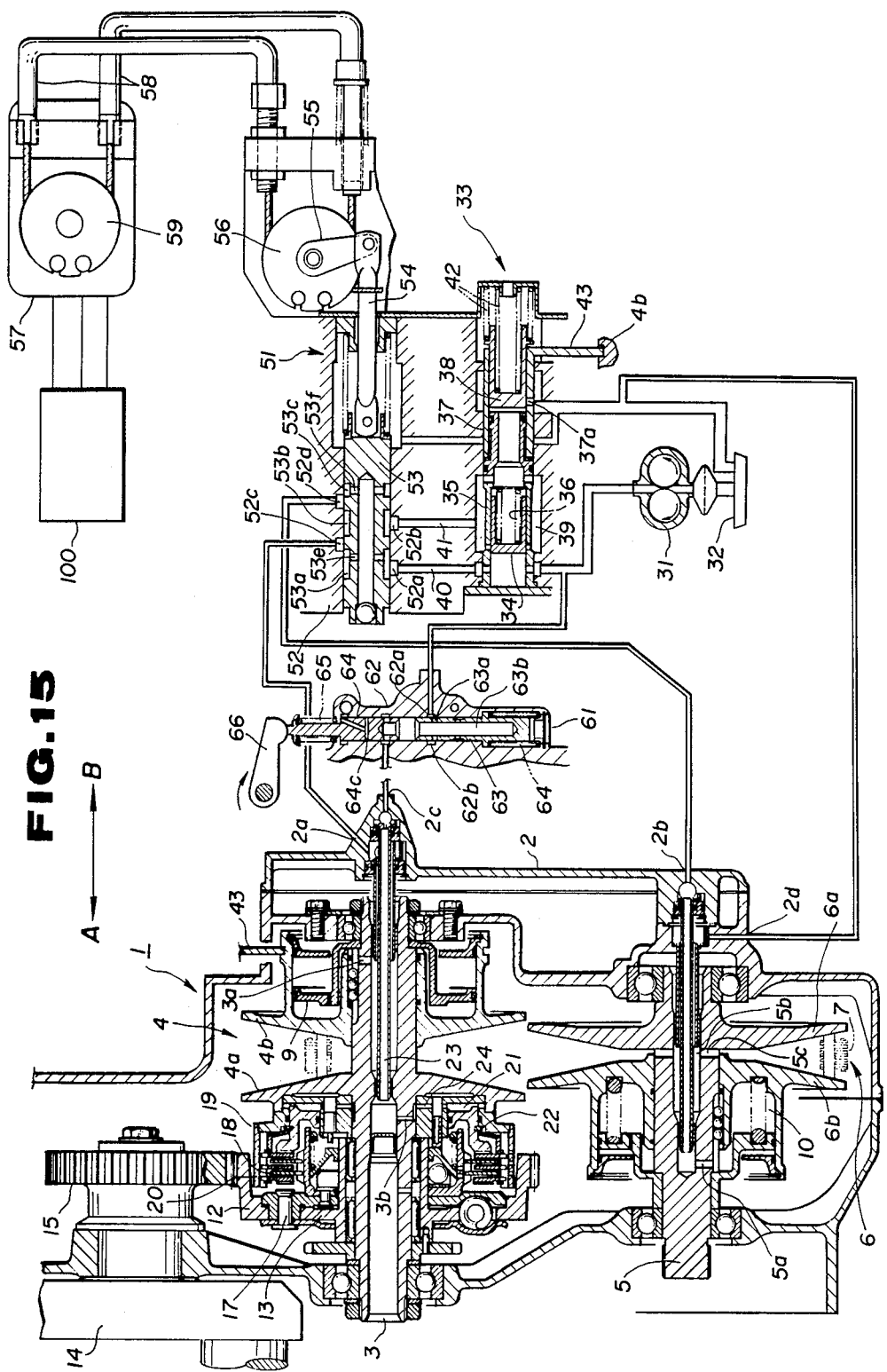

METHOD FOR CONTROLLING STEPLESS AUTOMATIC TRANSMISSION AND APPARATUS THEREFOR

BACKGROUND OF THE INVENTION

The present invention relates to a method for controlling a stepless automatic transmission of a vehicle and an apparatus therefor. More precisely, the apparatus and the method automatically controls the transmission ratio according to the change with respect to time of throttle aperture and driving condition of the vehicle.

Prior technology for automatically controlling a transmission ratio of a stepless transmission will be explained, for comparison, as follows.

A typical stepless transmission often used in a two-wheeled-vehicle, U.S. Pat. No. 4,543,077 for example, comprises a pair of pulleys connected to a drive shaft and a driven shaft, respectively. An endless belt is wound around the pair of pulleys so as to transmit a drive force from a drive pulley connected to the drive shaft to a driven pulley connected to the driven shaft. Each pulley has a pair of convex disks facing to each other so that the distance between them increases radially from inside to outside. The endless belt is disposed between the pair of disks. The distance between the facing disks is changeable. As the distance between the disks increases, the endless belt comes radially inwards. As the distance between the disks decreases, the endless belt goes radially outwards. Thus, the effective diameter of the pulley, that is the diameter by which the endless belt is wound around the pulley, can be varied by varying the distance between the disks and, consequently, transmission ratio can be varied.

Transmission ratio of the above-mentioned stepless transmission is controlled, according to a prior technology, as follows.

According to a prior technology, throttle aperture is controlled by a driver, and the objective engine speed and the transmission ratio are determined automatically by a prescribed procedure, as follows. First, an objective engine speed is determined according to a prescribed function which is generally an univocal and monotonously increasing function of the throttle aperture. The function is determined so as to give, for example, such an engine speed as provides a most economic driving of the vehicle, extracts a highest power output of the engine, etc. at every throttle aperture. The prescribed function is stored in memory means. Therefore, given the throttle aperture, the objective engine speed can be calculated automatically. Second, an objective transmission ratio is calculated and the transmission is adjusted to the objective ratio so that an actual engine speed coincides with the objective engine speed under the current speed of the vehicle.

According to the prior technology, the only information determinative of the objective engine speed, and consequently the transmission ratio, is the throttle aperture. In other words, whether the throttle is opened quickly or not does not affect the objective transmission ratio. Therefore, the prior technology does not provide a delicate control of a vehicle and sometimes caused inconveniences which may spoil the driving feeling of the vehicle.

For example, when a driver wants to accelerate the vehicle quickly, he has to open the throttle widely so that the transmission is set to a higher ratio. But this operation inevitably leads to an intensified acceleration, which may not be required always, corresponding to a wide aperture of the throttle. On the contrary, if it were for a conventionally geared transmission, the driver can shift up quickly and obtain a desired acceleration.

Another example is when an engine brake is needed. In order to obtain an effective engine brake according to the prior technology, it is necessary to close the throttle largely. Then the transmission is set to a high transmission ratio and an engine brake is obtained But, as mentioned above, this operation inevitably leads to an intensified engine braking of the vehicle which may not be always required.

In other words, intimate control of the vehicle such as a subtle acceleration and engine braking with limited intensity can not be realized by virtue of the prior technology.

SUMMARY OF THE INVENTION

An object of the present invention is, therefore, to provide a method for controlling a stepless transmission for realizing an improved driving feeling. For the object, a change with respect to time of the throttle aperture is taken into account in determining the objective engine speed and the transmission ratio.

According to a first aspect of the present invention, there is provided an apparatus for controlling a stepless automatic transmission of a vehicle which comprises (a) a throttle sensor for sensing a change with respect to time of a throttle aperture, (b) a first objective engine speed allocator for allocating an objective engine speed in the condition that the change with respect to time of the throttle aperture is within a prescribed range, (c) a second objective engine speed allocator for allocating an objective engine speed in a condition that the throttle aperture is opened more rapidly than a first prescribed value, (d) a third objective engine speed allocator for allocating an objective engine speed in a condition that the throttle aperture is closed more rapidly than a second prescribed value, and (e) a transmission controller for controlling a transmission ratio of the stepless automatic transmission so that an actual engine speed coincides with the objective engine speed.

According to a second aspect of the present invention, there is provided a method for controlling a stepless automatic transmission of a vehicle, the method comprising the steps of (a) sensing a change with respect to time of a throttle aperture, (b) allocating an objective engine speed according to the change with respect to time of the throttle aperture, and (c) controlling a transmission ratio of the stepless automatic transmission so that an actual engine speed coincides with the objective engine speed.

BRIEF DESCRIPTION ON THE DRAWINGS

FIGS. 4(a) through 4(d) are flow charts showing procedures performed by a control unit.

Figure 5:
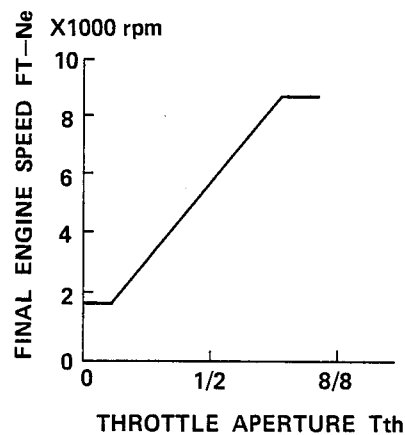

FIG. 5 shows a relation between a final objective engine speed and a throttle aperture referred to in the control unit.

Figure 6:
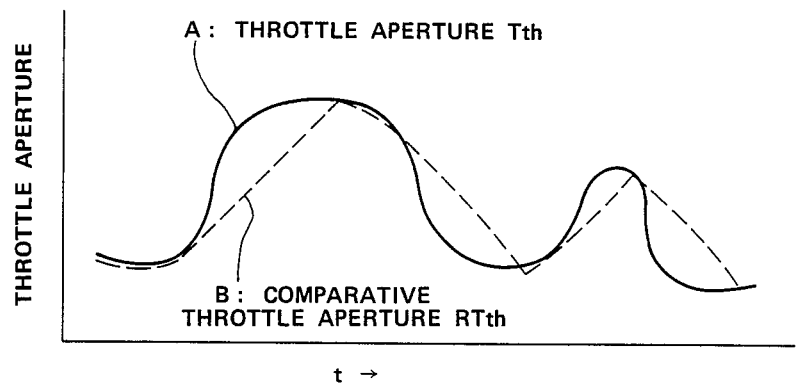

FIG. 6 shows a throttle aperture and a comparative throttle aperture as functions of time.

Figure 7:
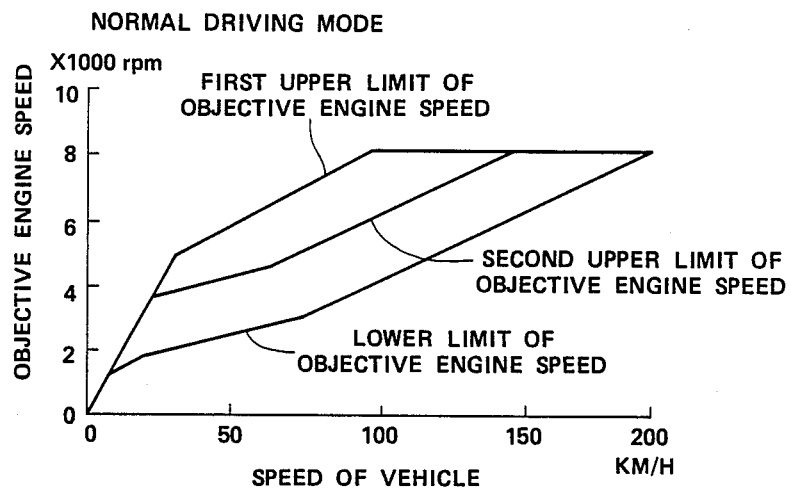

FIG. 7 shows a relation between the objective engine speed and the speed of the vehicle during a normal driving mode.

Figure 8:
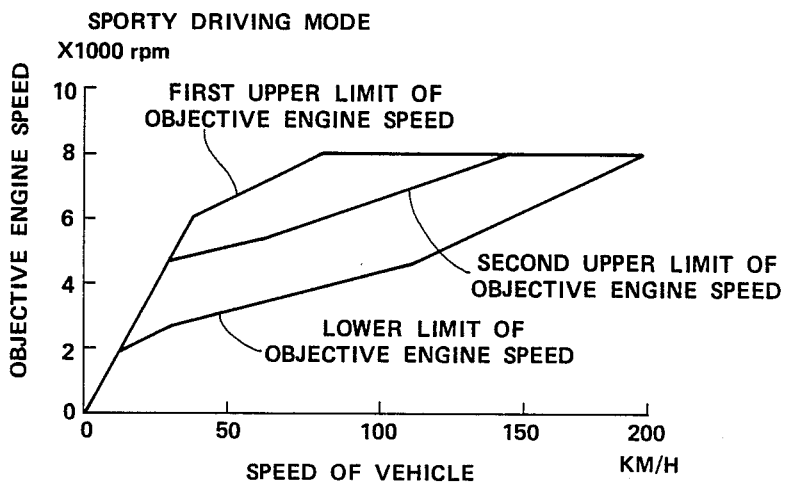

FIG. 8 shows a relation between the objective engine speed and the speed of the vehicle during a sporty driving mode.

Figure 9:
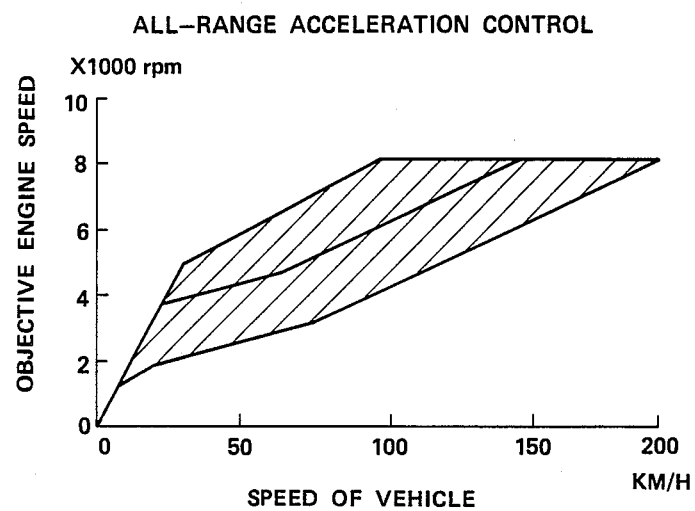

FIG. 9 shows a relation between the objective engine speed and the speed of the vehicle during an all-round acceleration control mode.

Figure 10:
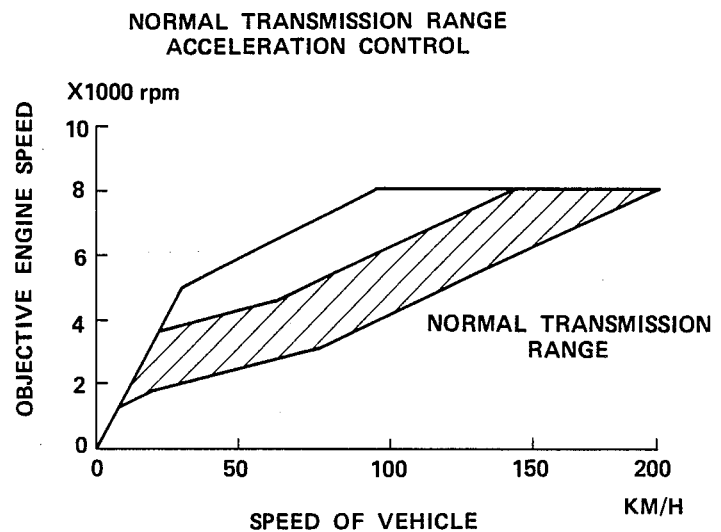

FIG. 10 shows a relation between the objective engine speed and the speed of the vehicle during a normal range acceleration control mode.

Figure 11:
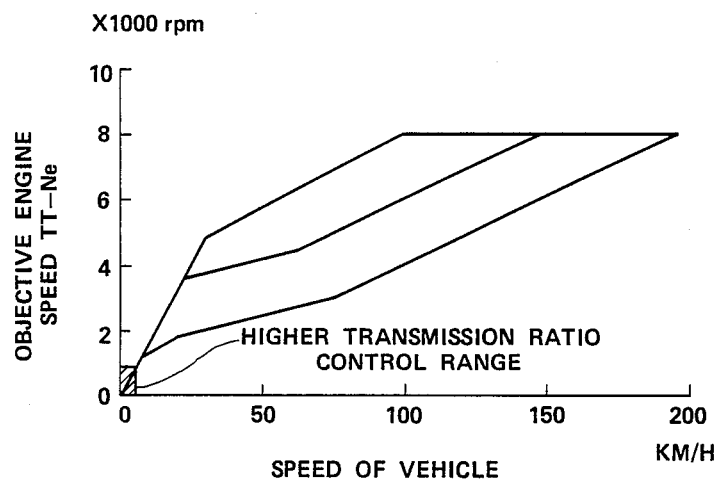

FIG. 11 is a figure to explain a higher transmission ratio control.

Figure 12:
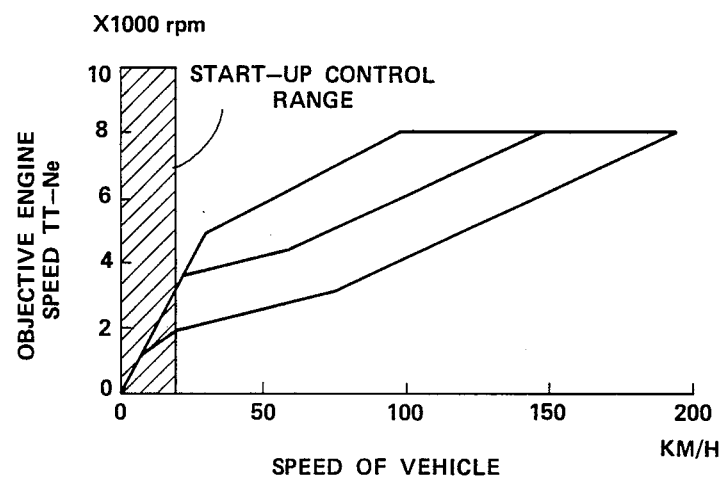

FIG. 12 is a figure to explain a start-up control.

Figure 13:
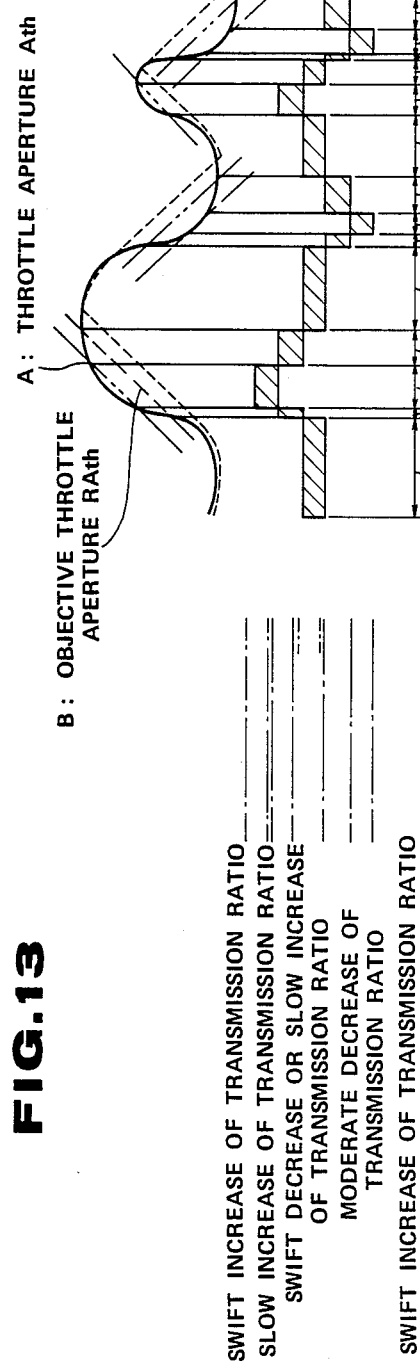

FIG. 13 shows changes of throttle aperture and operation of a transmission ratio control apparatus with respect to time.

Figure 14:
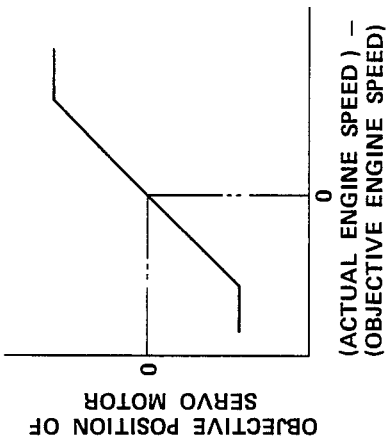

FIG. 14 shows a relation between a position of the servo-motor and the difference between the actual engine speed and the objective engine speed.

FIG. 15 shows a mechanism of a stepless automatic transmission and a transmission controller.

DETAILED DESCRIPTION OF THE PREFERRED EMBODIMENTS

Preferred embodiments of the present invention will be explained hereinafter with reference to the attached drawings. (Stepless Transmission)

A stepless transmission to which the following embodiment is to be applied will be described first with reference to FIG. 15.

The stepless automatic transmission 1 comprises an enclosure 2 enclosing a drive pulley 4 attached to a drive shaft 3, a driven pulley 6 attached to a driven shaft 5, an endless belt 7 wound around the drive pulley 4 and the driven pulley 6. The drive pulley 4 further comprises a pair of pulley disks 4a, 4b, a fixed pulley disk 4a and a slidable pulley disk 4b. The fixed pulley disk 4a is formed as a unitary construction with the drive shaft 3. The slidable pulley 4b is attached to the drive shaft 3 slidable along an axis of the shaft 3 without permitting a rotational movement relative to the shaft 3. The pulley disks 4a, 4b have respective convex surfaces 100a, 100b facing one to the other and have a distance therebetween increasing radially from a central portion to a peripheral portion thereof. At a side opposite to the convex surface 100b of the slidable pulley disk 4b is formed an oil chamber 9 between the pulley disk 4b and a chamber wall 101. Oil is fed to the oil chamber 9 through an oil port 2a formed through the enclosure 2, an annular space 102 formed around a feed oil tube 106 disposed at the center of the drive shaft 3, and a through hole 3a formed through a cylindrical wall 3c of the drive shaft 3. Oil can be fed to the oil chamber 9 or derived therefrom irrespective of the position of the pulley disk 4b and whether or not the pulley 4 is rotating. By changing the amount of oil retained in the oil chamber 9, the position of the slidable pulley disk 4b along the drive shaft 3, and thus the distance between the pair of pulley disks 4a, 4b is changeable.

The drive shaft 3 is connected to a crankshaft 14 through a clutch 16 and gear wheels 13, 15 in meshing contact with each other. The clutch 16 comprises first friction plates 18 connected to the gear wheel 13 through a clutch inner 17 and second friction plates 20 connected to the drive shaft 3 through a clutch outer 19. The friction plates 18, 20 are disposed coaxial and parallel to each other to have a same distance between respective opposing friction plates 18 and 20. An oil chamber 21 is formed between a clutch piston 22 holding the second friction plates 20 and the fixed pulley disk 4a. When oil is led into the oil chamber 21, the clutch piston 22 thrusts the second friction plates 20 towards the first friction plates 18 so that they do not permit a movement relative to each other. Thus, the clutch 16 is connected and drive force is transmitted from the engine to the drive shaft 3 therethrough. Oil is led to the oil chamber 21 through an oil port 2c formed through the enclosure 2, a central space 23 formed through the oil feed tube 106, a through hole 3b formed through the cylindrical wall 3c of the drive shaft 3. Oil is fed to or derived from the oil chamber 21 whether or not the pulley 4 is rotating.

The driven pulley 6 comprises a slidable pulley disk 6b having a convex surface 103b and attached coaxial to the driven shaft 5 slidable along the axis thereof, a fixed pulley 6a having a convex surface 103a and formed unitary with the driven shaft 5 so that the convex face 103a faces the convex surface 103b. An oil chamber 10 is formed between the slidable pulley disk 6b and a chamber wall 104. An oil feed line is provided through an oil port 2b, an oil feed pipe 11, and a through hole 5a formed through the driven shaft wall. Oil is led to and from the oil chamber 10 through the oil feed line whether the driven pulley 6 is rotating or not and the position of the slidable pulley disk 6b is determined according to the amount of the oil.

An oil feed line to lead oil to the endless belt 7 is formed through an oil port 2d formed through the enclosure 2, an annular space formed between the driven shaft 5 and the oil feed tube 11, and a plurality of through holes 5c formed through the driven shaft 5.

(Construction of the Pressure Regulator)

An oil pump 31 is fed with oil from an oil tank 32 and pumps out the oil through an oil outlet line 110. The oil outlet line 110 is connected to a pressure regulator 33 which regulates the pressure of the oil and feeds the oil to a distributor 51 at two different pressure levels, the pressure levels being variable while keeping a difference between them constant.

The pressure regulator 33 comprises an oil cylinder 35 of which an inner cylindrical space is divided into a high pressure chamber 111 and a low pressure chamber 112 by a first regulator piston 34 which is slidable in the cylindrical space. A left end, according to FIG. 15, of the oil cylinder 35 opposing the regulator piston 34 is closed by a casing wall 113. A first pressure spring 36 is provided in the first regulator piston 34 to give a thrust force toward the casing wall 113 thereto. On the other side of the first regulator piston 34, is a slidable sleeve 37 and a second regulator piston 38 is provided in the cylindrical space. A closed space is formed by the first regulator piston 34, the slidable sleeve 37, the second regulator piston 38 and the oil cylinder 35.

Oil is fed from the oil pump 31 to the high pressure chamber 111. Pressure in the high pressure chamber 111 increases and the first regulator piston 34 is thrusted by the pressure of the oil in the high pressure chamber 111. Therefore, the first regulator piston 34 moves rightwards in FIG. 15 against a resilient force of the first pressure spring 36. When the displacement of the first regulator piston 34 becomes larger than a certain value, the low pressure chamber 112 is connected to the high pressure chamber 111 through a communication line 39 formed through the cylinder 35. As a result of the oil flow from the high pressure chamber 111, pressure in the low pressure chamber 112 increases. But, when the pressure in the low pressure chamber 112 increases over a certain value, the first regulator piston 34 displaces leftwards to close the communication line 39. Therefore, the pressure difference between the high pressure chamber 111 and the low pressure chamber 112 is kept constant so as to be equal to the pressure generated by the first pressure spring 36 when the first regulator piston 34 closes the communication line 39. Thus, the pressure difference between the two chambers is kept constant.

On the other side of the second regulator piston 38, there is provided a second regulator spring 42 which gives a thrust force to the second regulator piston 38 toward the first regulator piston. A through hole 37a is formed through the slidable sleeve 37. When the pressure in the low pressure chamber 112 increases higher than a certain level, the second regulator piston 38 displaces against the resilient thrust force of the second regulator spring 42 and the low pressure chamber 112 is communicated with the oil tank 32 through the through hole 37a. Therefore, the pressure of the low pressure chamber 112 does not increase over a value which is determined by the thrust force given by the second regulator spring 42 when the second regulator piston is at the through hole 37a. Location of the through hole 37a can be dislocated by sliding the slidable sleeve 37. Therefore, maximum pressure of the low pressure chamber 112 can be varied by varying the position of the slidable sleeve 37.

In this manner, pressure in the high pressure chamber 111 and that of the low pressure chamber 112 can be varied while keeping constant the pressure difference between them.

The slidable sleeve 37 is mechanically connected to the slidable pulley disk 4b of the drive pulley 4 through a sleeve lever 43 so that the pressure of the high pressure chamber 111 and the low pressure chamber 112 are varied according to the movement of the pulley disk 4b. More precisely, when the pulley disk 4b moves toward the direction A to narrow the gap between the pulley disks 4a, 4b, the slidable sleeve 37 slides in the same direction to lower the pressure in the chambers 111, 112. A narrower gap between the pulley disks 4a, 4b corresponds to a larger effective diameter of the pulley 4 and a smaller transmission ratio. Hereinafter in the specification and claims, the transmission ratio indicates the ratio of a rotational speed of the drive shaft and corresponding rotational speed of the driven shaft. On the contrary, when the slidable pulley disk 4b slides away from the fixed pulley disk 4a and the effective diameter of the pulley 4 decreases increasing the transmission ratio, the slidable sleeve 37 slides in direction B so as to increase the pressure of the chambers 111, 112.

Construction of the Oil Distributor

The high pressure oil and the low pressure oil are supplied from the oil regulator 33 to the oil distributor 51 through a high pressure oil feed line 40 and a low pressure oil feed line 41, respectively. The oil distributor 51 comprises a cylindrical body 52 and a slider element 53 disposed slidably in a hollow space of the cylindrical body 52. The cylindrical body 52 is provided with a high pressure inlet port 52a connected to the high pressure oil feed line 40, a low pressure inlet port 52b connected to the low pressure oil feed line 41, a drive pulley outlet 52c connected to the oil port 2a, and a driven pulley outlet 52d connected to the oil port 2b. An axial cavity 114 is formed along the axis of the slider element one end being closed by a ball lid 115 and the other by the slider element 53 itself. Around the outer surface of the slider element 53, three annular grooves 53a, 53b, 53c are formed parallel to each other. A pair of communication holes 53e are formed through the slider element 53 to communicate the annular groove 53a to the axial cavity 114. A pair of communication holes 53f are formed through the slider element 53 to communicate the annular groove 53c to the axial cavity 114. A tie rod 54 is connected to the sliding element 53 and the tie rod 54 is connected to a control lever 55 of a control drum 56 which is activated by a servo motor 57 through a servo drum 59 and a pair of control cables 58. Movement of the servo motor 57 is controlled by a control unit 100.

By a rotation of the servo motor 57, the sliding element 53 slides within the cylindrical body 52 of the oil distributor 51 and oil flow changes according to the position of the sliding element 53, as follows.

When the sliding element 53 is at an intermediate position as shown in FIG. 15, the high pressure oil feed line 40 is connected to the drive pulley outlet 52c through the annular groove 53a. The high pressure oil feed line 40 is also connected to the driven pulley outlet 52d through the annular groove 53a, the communication holes 53e, the axial cavity 114, the communication holes 53f, and the annular groove 53c. Thus, the high pressure oil is provided to the drive pulley 4 and the driven pulley 6 so as to narrow the gap between the pulley disks 4a and 4b; and 6a and 6b and to give a suitable amount of tension to the endless belt 7.

When the sliding element 53 is at a right side position, the high pressure oil feed line 40 is connected to the drive pulley outlet 52c through the annular groove 53a. A bypass line connecting the high pressure oil feed line 40 and the drive pulley outlet 52c is formed through the annular groove 53a, the communication holes 53e and the axial cavity 114. On the other hand, the low pressure oil feed line 41 is connected to the driven pulleY outlet 52d through the annular groove 53c. Thus, the high pressure oil is supplied to the drive pulley 4 and the low pressure oil is supplied to the driven pulley 6. As a result, the effective diameter of the drive pulley 4 increases and the effective diameter of the driven pulley 6 decreases, and the transmission ratio decreases. A constant tensile force is maintained in the endless belt 7 by virtue of the constant difference between the high pressure and the low pressure of the supplied oil.

When the sliding element 53 is at a left side position, the high pressure oil feed line 40 is connected to the driven pulley outlet 52d through the annular groove 53a, the communication holes 53e, the axial cavity 114, the communication holes 53f, and the annular grooves 53c. The low pressure oil feed line 41 is connected to the drive pulley outlet 52c through the annular groove 53b. Thus, the high pressure oil is supplied to the driven pulley 6 and the low pressure oil is supplied to the drive pulley 4. As a result, the effective diameter of the drive pulley 4 decreases and that of the driven pulley 6 increases, increasing the transmission ratio.

Figure 2:
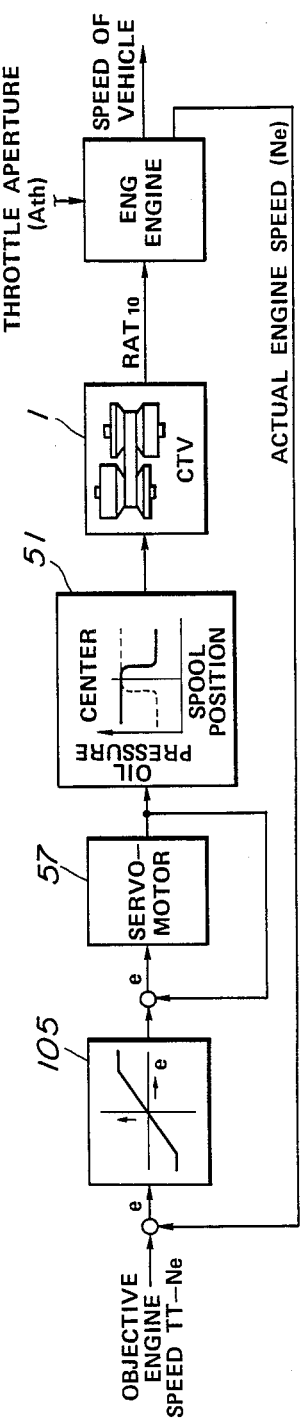
FIG. 2 is a block diagram showing a procedure performed in the transmission controller.
Figure 3:
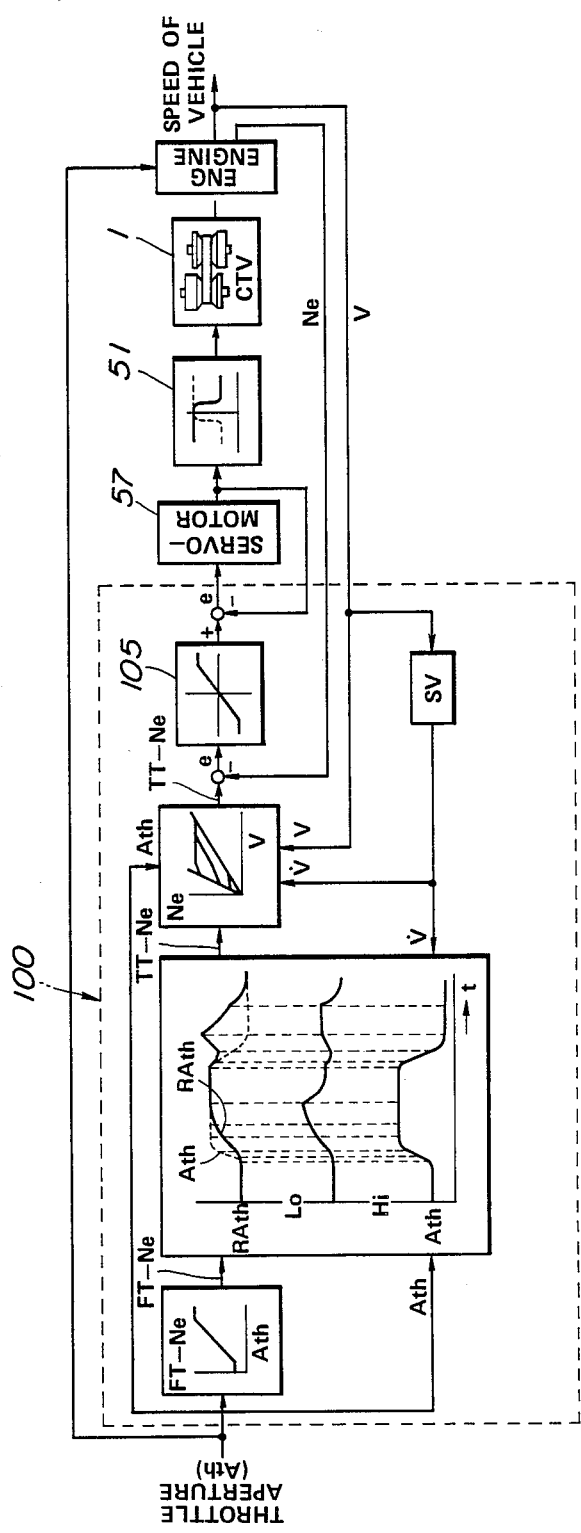
FIG. 3 is a block diagram showing a procedure performed in a control unit.

The block numbered 80 in FIGS. 2 and 3 indicate schematically the relation of the pressure of the supplied oil and the position of the sliding element 53. In the figures, the abscissa corresponds to the position of the sliding element 53 as shown in FIG. 15 and the ordinate corresponds to the pressure of the supplied oil. The vertical line drawn at the center of the graph designates the intermediate position of the sliding element 53. The solid line and the dotted line designate the oil pressure supplied to the driven pulley 6 and the drive pulley 4, respectively.

Construction of the Clutch Operation Valve

A clutch operation valve 61 receives high pressure oil from the high pressure oil feed line 110 through a branch line 122 and supplies the oil to the clutch 16. The clutch operation valve 61 comprises an enclosure 62 in which a cylindrical bore hole 120 is formed, a lower piston 63 retained slidable in the bore hole 120, a lower spring 121 thrusting the lower piston 63 upwards, an upper piston 64 retained slidable in the bore hole 120, and an upper spring 65 thrusting the upper piston 64 upwards. A clutch arm 66, which is connected to a clutch lever (not shown) to be operated by a driver, is in contact with an upper end of the upper piston 64 projecting out of the enclosure 62. FIG. 15 shows the upper piston 64 and the lower piston 63 at their upper positions. As the clutch arm 66 turns clockwise as shown by an arrow in the figure, the upper piston 64 is pushed down and the lower piston 63 goes down consequently by virtue of the oil retained in the bore hole 120.

When the pistons 63, 64 are at the position shown in FIG. 15, the clutch 16 is connected. That is, the pressurized oil is supplied to the oil chamber 21 to press the first and the second friction plates against each other through the branch line 122, an oil inlet 62a, a through hole 63a formed through the lower piston 63, an axial bore hole 63b formed along the axis of the lower piston 63, the cylindrical bore hole 120, an axial bore hole 64b formed in the upper piston 64, a through hole 64a formed through the upper piston 64, an outlet port 62c, an oil port 2c, a central space 23 formed through the oil feed tube 106, and a through hole 3b formed through the cylindrical wall 3c of the drive shaft 3.

When the clutch arm 66 turns clockwise to push down the upper piston 64, the clutch 16 is disconnected. That is, the above-mentioned oil feed line leading pressurized oil to the clutch 16 is disconnected at the outlet port 62c. On the other hand, the outlet port 62c is connected to a discharge line 64c formed through the upper piston 64 to lead the pressurized oil in the clutch 16 out of it. Again, if the clutch arm 66 is turned anti-clockwise, the upper and the lower pistons 64, 63 slide upwards by virtue of the resilient force of the springs 65, 121.

The clutch operation valve 61 also regulates the pressure of the oil to be supplied to the clutch 16 by virtue of the following mechanism. When the pressure of the oil supplied to the valve 61 is higher than a prescribed level, the oil retained in the cylindrical bore hole 120 pushes the lower piston 63 downwards. Then, the through hole 63a is disaligned from the branch line 122 so as not to receive further oil from the branch line 122.

Mechanical Operation of the above-mentioned Structures

As a result of the above-mentioned operation of the oil distributor 51, transmission ratio at the stepless automatic transmission 4 is controlled. Position of the sliding element 53 is determined by virtue of the servo motor 57 which is controlled by the control unit 100. The control unit 100 determines the movement of the servo-valve according to the driving condition of the vehicle, as is described in more detail later. The high pressure oil and the low pressure oil are supplied selectively to either the driving pulley 4 or the driven pulley 6 so as to change the transmission ratio. By changing the transmission ratio, engine speed is maintained as calculated and determined by the control unit 100. Once the actual engine speed coincides with the objective engine speed the sliding element is located to the intermediate position to keep the transmission ratio as it is. While keeping the transmission ratio, high pressure oil is supplied to both the drive pulley 4 and the driven pulley 6 to give a suitable tension to the endless belt 7. By operating the clutch arm 66 through the clutch lever, driving force of the engine is disconnected from the driven pulley 6 regardless of the transmission ratio.

Control Unit

Figure 1:
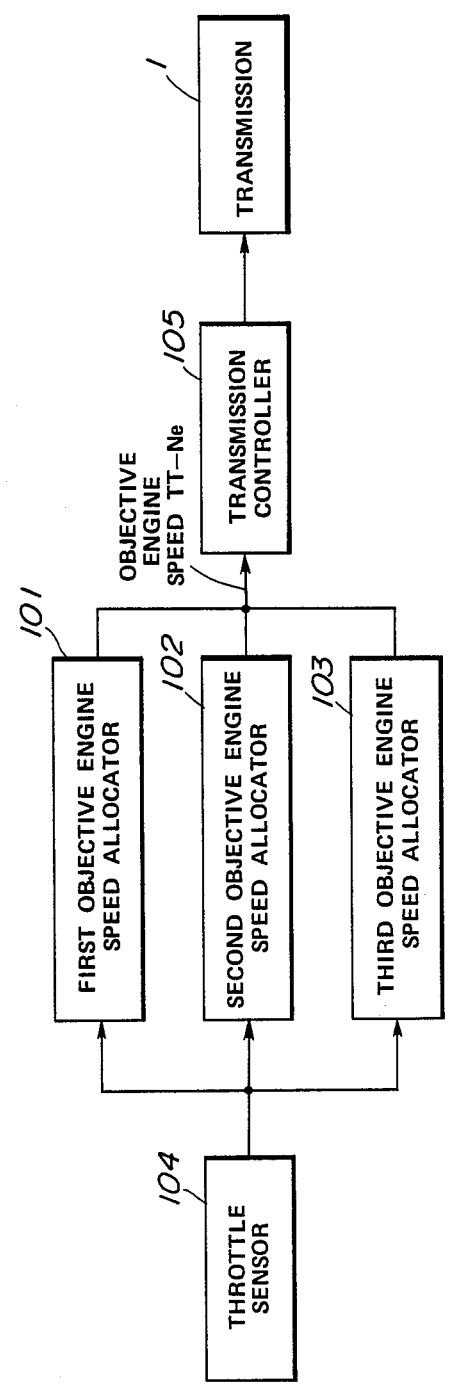
FIG. 1, is a block diagram showing principal portions of the method for controlling a stepless automatic transmission according to the present invention.

The control unit comprises a throttle sensor 204 for sensing a throttle aperture and calculating a change with respect to time of the throttle aperture, a first objective engine speed allocator 201, a second objective engine speed allocator 202, a third objective engine speed allocator 103, and a transmission ratio controller 205, as schematically shown in FIG. 1.

The throttle sensor 204 measures the throttle aperture Ath and calculates the comparative throttle aperture RAth according to the prescribed procedure as follows. When the throttle aperture Ath is larger than the current comparative throttle aperture RAth, an increment, equal to the difference of the throttle aperture Tth and the comparative throttle aperture RAth is added to the comparative throttle aperture RAth, so that the comparative throttle aperture RAth coincides with the throttle aperture Ath. But the increment to be added to the comparative throttle aperture RAth does not exceed a prescribed value Dth0. Therefore, when the throttle aperture Ath increases more rapidly than Dth0, the comparative throttle aperture RAth does not coincide with the throttle aperture any longer and there occurs a difference between the two. On the contrary, when the throttle aperture Ath is smaller than the comparative throttle aperture RAth, an increment being equal to the difference of the throttle aperture Ath and the comparative throttle aperture RAth, which is negative, is added to the comparative throttle aperture RAth so that the comparative throttle aperture RAth coincides with the throttle aperture But, the increment to be added to the comparative throttle aperture RAth does not become less than a prescribed value −Dth0. Therefore, when the throttle aperture Ath decreases more rapidly than −Dth0, the comparative throttle aperture RTth does not coincide with the throttle aperture any longer and there occurs a difference between the two. When the throttle aperture Ath does not coincide with the comparative throttle aperture, the control unit calculates the change with respect to time of the throttle aperture Ath on the basis of the difference between the throttle aperture Ath and the comparative throttle aperture RAth.

One of the first, the second and the third objective engine speed allocators 201, 202, 203 functions according to the change with respect to time of the throttle aperture so as to allocate an objective engine speed TT-Ne.

The first objective engine speed allocator 201 functions to allocate an objective engine speed TT-Ne when the change with respect to time of the throttle aperture is moderate, that is, when the comparative throttle aperture RAth coincides with the throttle aperture Ath. First, given a throttle aperture Ath, a final objective engine speed FT-Ne, which is an increasing single-valued monotone function of the throttle aperture Ath, is determined according to a relation shown in FIG. 5. Various functions may be employed to relate the throttle aperture Ath and the final objective engine speed FT-Ne. For example, the final objective engine speed FT-Ne may be the engine speed which realizes a most fuel saving driving of the vehicle or that which keeps the engine speed at a most powerful range, etc. Second, an objective engine speed TT-Ne is determined taking into account the final objective engine speed FT-Ne, an actual engine speed, a difference of the comparative throttle aperture RAth and the throttle aperture Ath, the speed of the vehicle, etc. When the final objective engine speed FT-Ne is higher than the actual engine speed, the allocated objective engine speed TT-Ne is higher than the actual engine speed and lower than or equal to the final objective engine speed FT-Ne. When the final objective engine speed FT-Ne is lower than the actual engine speed, the allocated objective engine speed TT-Ne is lower than the actual engine speed and higher than or equal to the final objective engine speed FT-Ne.

The second objective engine speed allocator 202 functions when the change with respect to time of the throttle aperture is larger than a prescribed value, that is, the throttle aperture Ath is larger than the comparative throttle aperture RAth. The allocator 202 allocates an objective engine speed TT-Ne irrespective of the final objective engine speed FT-Ne. The objective engine speed TT-Ne determined hereby is generally equal to the engine speed which may be obtained when the throttle is opened rapidly to perform a kick down operation on a conventional automatic transmission The objective engine speed TT-Ne given hereby is higher than the objective engine speed TT-Ne which may be allocated according to the first engine speed allocator 201.

The third objective engine speed allocator 203 functions when the change with respect to time of the throttle aperture is smaller than a prescribed value, that is, when the throttle aperture Ath is smaller than the comparative throttle aperture RTth. In other words, it functions when the throttle is closed rapidly. Here again, the objective engine speed TT-Ne is determined irrespective of the final objective engine speed FT-Ne. The objective engine speed determined hereby is generally equal to the engine speed which enables an engine braking. Therefore, the objective engine speed TT-Ne is higher than the engine speed which may be allocated according to the first engine speed allocator 201.

The transmission ratio controller 205 calculates the angle to rotate the servo motor 57 according to the actual engine speed and the objective engine speed TT-Ne according to a procedure shown in FIG. 2. Graph 105 of FIG. 2 shows schematically a relation of the difference between the objective engine speed TT-Ne and the actual engine speed versus rotational angle of the servo motor. As above mentioned, the sliding element 53 of the oil distributor 51 displaces according to the rotation of the servo valve and the effective diameter of pulleys 4, 6 is altered to change the transmission ratio.

In brief, the control unit 100 controls the transmission ratio taking into account the change with respect to time of the throttle aperture together with other factors in order to realize automatically kick down and engine brake when the throttle is opened and closed rapidly, respectively FIG. 3.

Further modified embodiments of the control unit 100 will be explained hereinafter in detail with reference to FIGS. 4(a) through 4(d) which are to be linked to each other.

Figures 2, 4A:
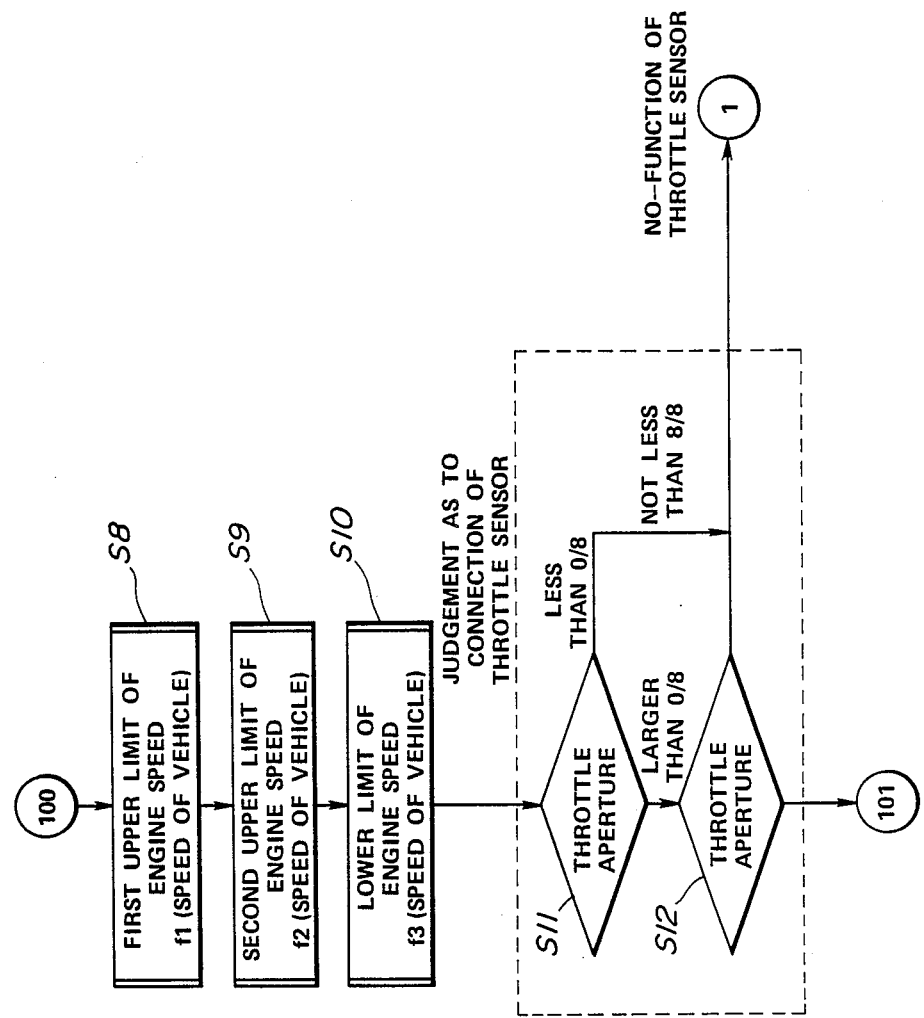
Figures 3, 4A:
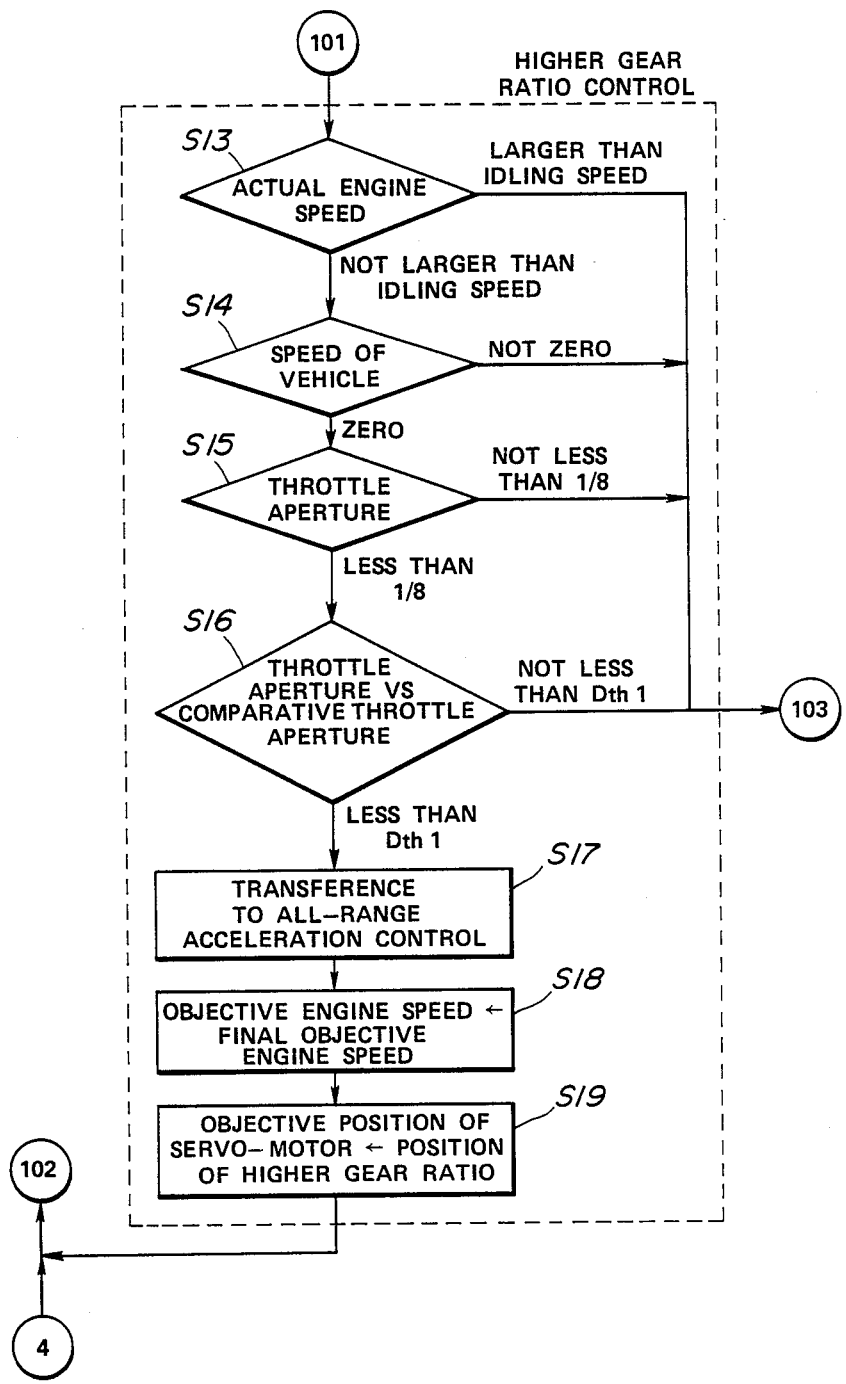
Figures 4, 4A:
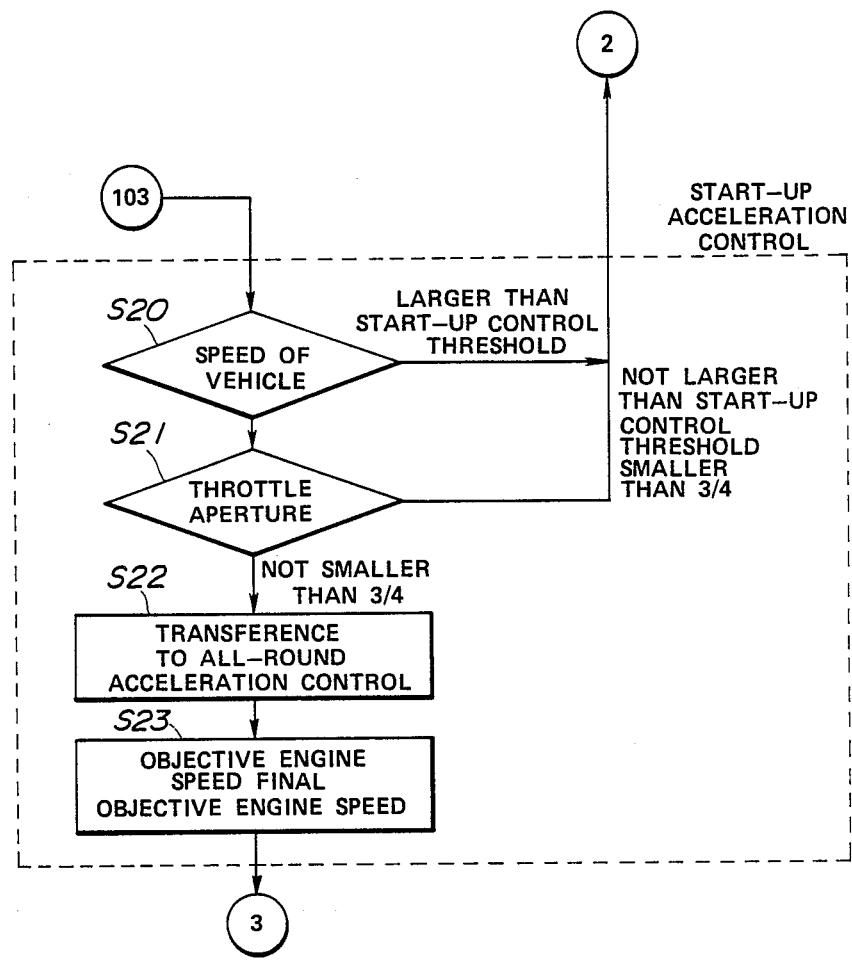

According to FIG. 4(a), the throttle aperture is measured (S1), actual engine speed is measured (S2), actual speed of the vehicle is measured (S3), and a final objective engine speed FT-Ne is calculated (S4) according to the actual throttle aperture Tth. Next, the actual throttle aperture Ath is compared with the comparative throttle aperture RAth (S5). If the actual throttle aperture Ath is larger than the comparative throttle aperture RAth, the control proceeds to (S7) and the comparative throttle aperture RTth is increased by an increment so that the comparative throttle aperture RAth may coincide with the throttle aperture Tth. But, because the increment does not exceed a prescribed value Dth0, the comparative throttle aperture RAth may not coincide with the throttle aperture Tth when the throttle is opened more rapidly than a certain value. If the actual throttle aperture Ath is lower than the comparative throttle aperture RTth, the control proceeds to (S6) and a similar procedure is performed to lower the comparative throttle aperture RTth. Accordingly, the comparative throttle aperture RAth varies with respect to time more moderately than the throttle aperture Ath as shown in FIG. 6.

Once the comparative throttle aperture RAth is determined, a first upper limit of engine speed, a second upper limit of objective engine speed and a lower limit of objective engine speed are determined according to the maps stored in a memory device, (S8), (S9), (S10). FIG. 7 and FIG. 8 show examples of the map. FIG. 7 is a map showing a relation of the first upper limit of objective engine speed, second upper limit of engine speed and lower limit of engine speed versus speed of the vehicle, in a normal driving mode. FIG. 8 shows a same objective relation but in a sporty driving mode. The three limits of engine speed in the sporty driving mode are higher than or equal to the corresponding three limits in the normal driving mode. One driving mode is selected by an operation of the driver, for example, out of the two modes.

Next, reliability of the throttle sensor for sensing an aperture of the throttle is examined. When the aperture of the throttle measured by the sensor is negative or larger than the full throttle, the control unit judges that the sensor is out of order or not reliable and proceeds to an abnormal routine, (S11), (S12). These two steps (S11) and (S12) may be performed succeeding to the step (S1) of sensing the throttle aperture.

Standing Start Control

Steps from (S13) through (S19) form a standing start control procedure corresponding to a start of the vehicle from a standing state. Through (S13) to (S16), it is examined whether or not the actual engine speed is lower than the idling speed, the actual speed is practically zero, the throttle aperture is smaller than ⅛, or difference between the actual throttle aperture Ath and the comparative throttle aperture RAth is smaller than a prescribed value Dth1. If at least one of the answer to the above examination is negative, it is judged that the vehicle is not at a standing start state and the control proceeds to a starting acceleration control procedure which will be described later. If all of the answers to the above examination are positive, the control proceeds to an all-range acceleration control (S17) and allocates an objective engine speed TT-Ne equal to the final engine speed FT-Ne (S18). In the all-range acceleration control, the objective engine speed can be selected from the hatched region including the line passing through the origin, in FIG. 9. The final engine speed FT-Ne, and therefore the objective engine speed TT-Ne, has its lowest value as shown in FIG. 5 because the throttle aperture is at a smallest range during the procedure. Then, the servo motor is rotated to allocate a highest maximum transmission ratio (S19) irrespective of the objective engine speed TT-Ne. As the speed of the vehicle is low, the control more precisely on the line passing through the origin in the hatched area in FIG. 11. Then the control returns to the step (S1) and repeats the same procedure.

Starting Acceleration Control

When one of the answers to the questions of steps (S13) to (S16) is negative, the control proceeds to the starting acceleration control procedure. At first, in the starting acceleration control procedure, it is examined whether or not the speed of the vehicle is higher than a prescribed value, (S20). If the current speed is higher than the prescribed value, the control gets out of the starting acceleration control procedure and proceeds to a variable transmission range control procedure. If the current speed is not higher than the prescribed value, it is examined whether or not the throttle aperture is smaller than ¾ of full throttle (S21). If the throttle aperture is smaller than ¾ of full throttle, the control again gets out of the starting acceleration control procedure and proceeds to the variable transmission range control procedure. If the throttle aperture is not smaller than ¾ of full throttle, the control remains in the starting acceleration control procedure, and proceeds to the all-range acceleration control procedure, (S22), and the objective engine speed TT-Ne is allocated to be equal to the final objective engine speed FT-Ne (S23). Even though the objective engine speed TT-Ne is under control of the all-range acceleration control procedure, the objective engine speed actually takes the value in the hatched region in FIG. 12 because the speed of the vehicle is small as has been checked in step (S20). Then the control proceeds to the operation of the transmission control unit 205.

Variable Transmission Range Control

Figures 3, 4B:
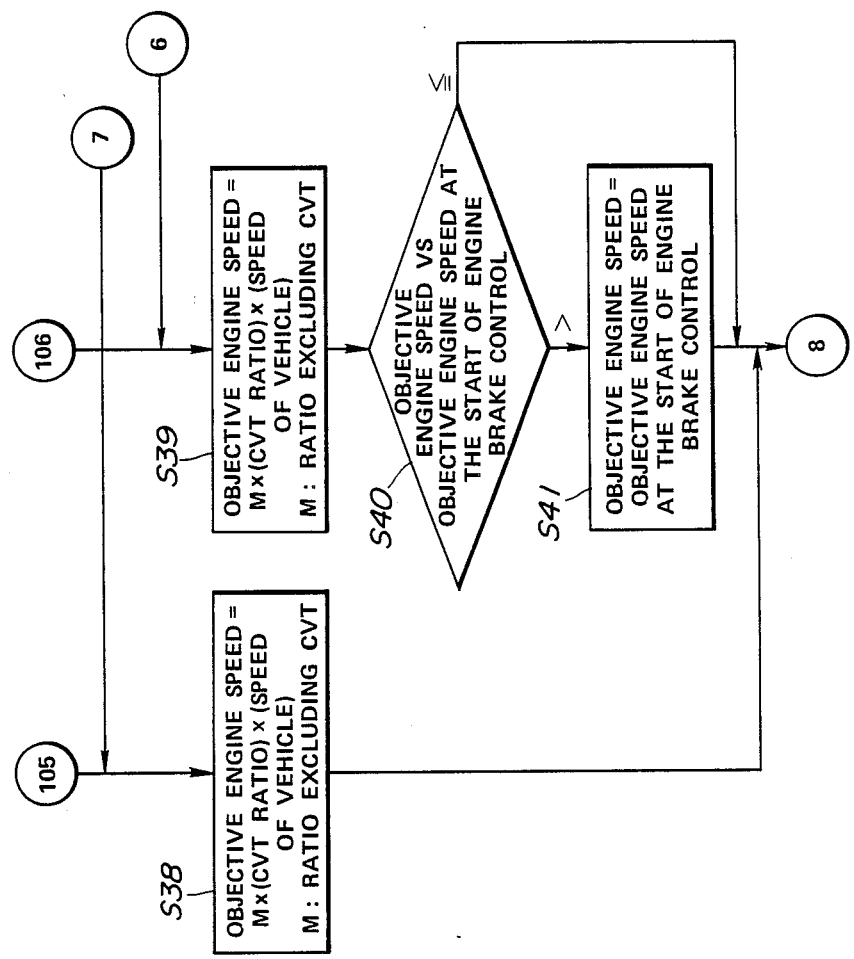
Figures 1, 4C:
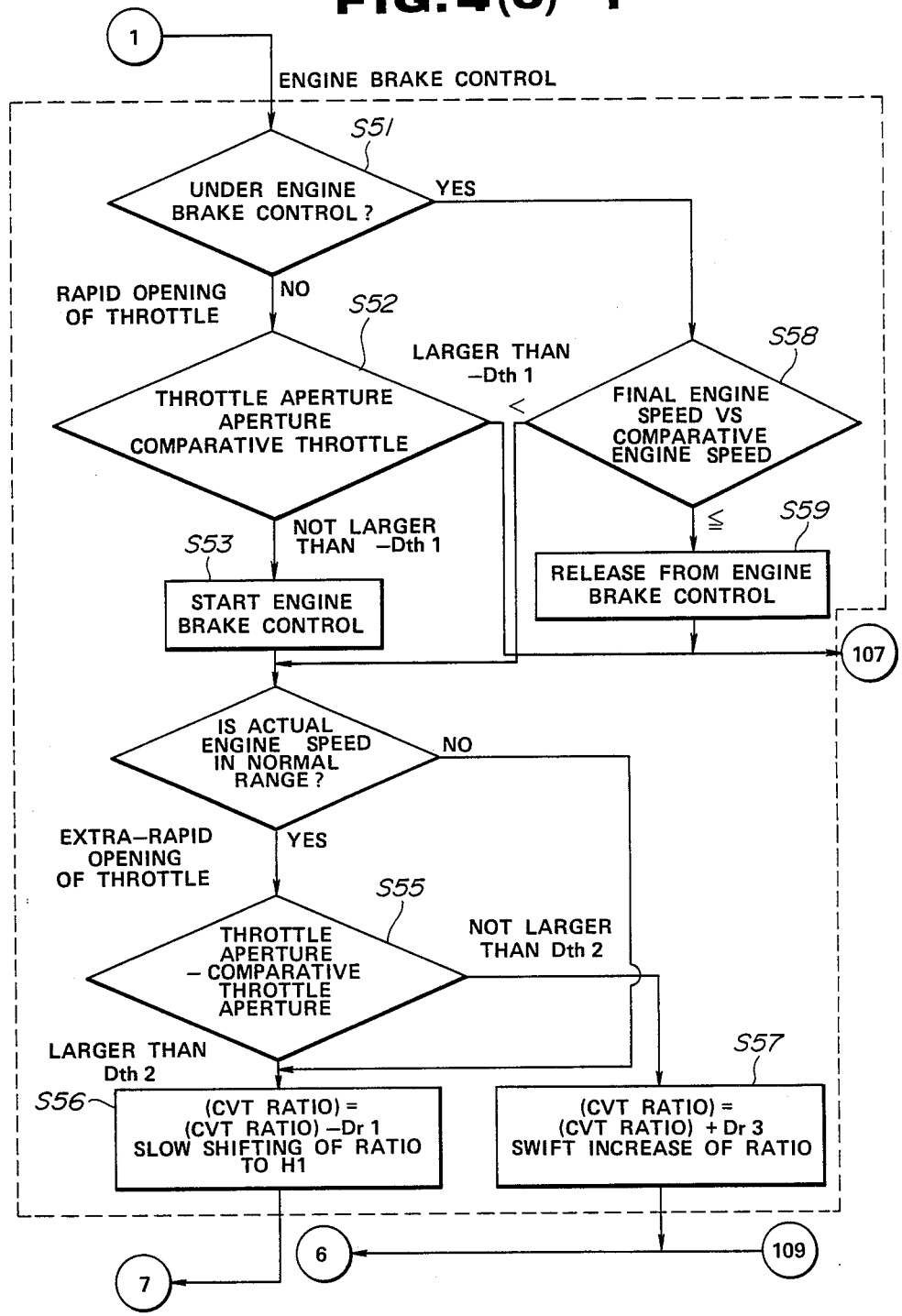
Figures 3, 4C:
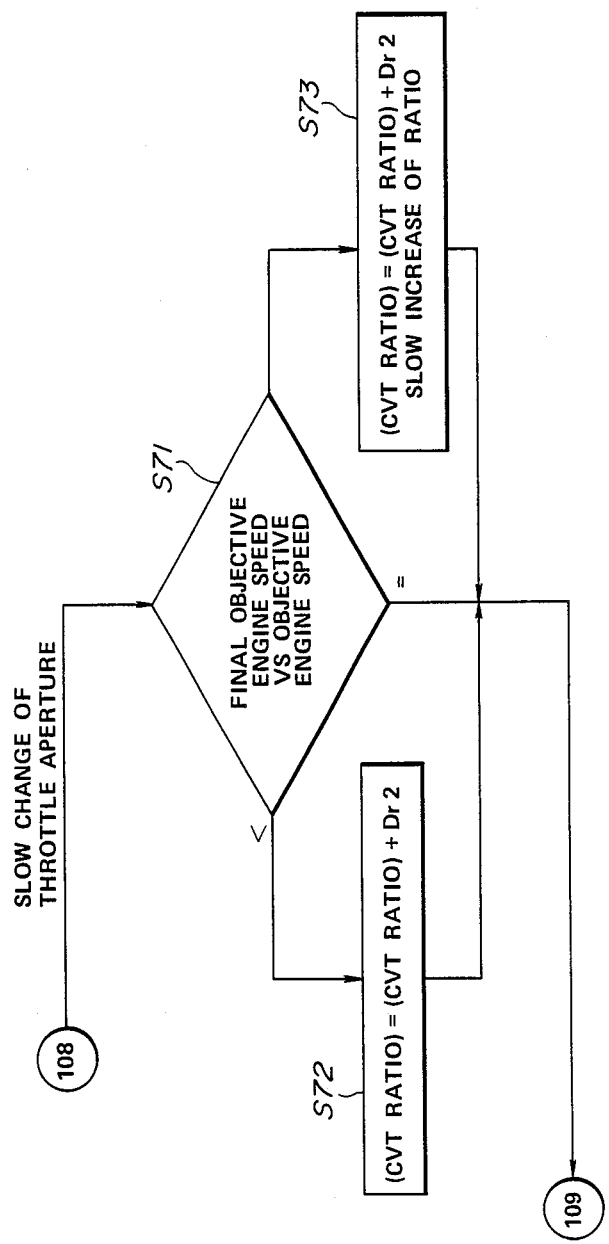

The variable transmission range control procedure starts when either the speed of the vehicle is higher than the above-mentioned value or the throttle aperture is smaller than ¾ of full throttle, FIG. 4(b). In other words, the variable transmission range control starts when the state of the vehicle is in neither a standing state nor a starting state. In the variable transmission range control procedure, acceleration of the vehicle is first examined, (S24). If the acceleration is lower than −0.05G, that is if the vehicle is slowing down, the control proceeds to step (S25). If the acceleration is higher than −0.05G, the control proceeds to step (S28). At step (S25), the throttle aperture Ath is compared with the comparative throttle aperture RAth, (S25). If the difference is larger than Dth1, the control proceeds to the all-range acceleration control (S27). If the difference is smaller than Dth1 throttle aperture is compared to ½ of full throttle. If the throttle aperture is equal to or larger than ½ of full throttle, the control proceeds to the all-range acceleration control procedure (S27). In the condition that the vehicle is slowing down and the throttle is being opened quickly or largely, the control arrives at the all range acceleration control which allocates higher engine speeds which is suitable in hill climbs. If the throttle aperture is smaller than ½ of full throttle, the control proceeds to step (S32). At the step (S28), it is judged whether or not the engine speed is in a normal range. If yes, the control proceeds to step (S29). If no, the control proceeds to step (S32). At step (S29), it is examined if the former engine speed was in the normal range or not. If yes, the control proceeds to step (S30), if no, the control proceeds to a normal transmission control (S31). At step (S30), transmission ratio of the stepless transmission 1 is compared with a prescribed value DrO. If the transmission ratio is smaller than the prescribed ratio DrO, the control proceeds to (S31) and the objective engine speed TT-Ne is determined according to the relation, that is, the normal acceleration control, shown in FIG. 10 within the hatched region. According to the normal acceleration control, the objective engine speed TT-Ne is determined not to exceed the above-mentioned second highest engine speed. Otherwise, the control proceeds to the all region acceleration control (S27).

At step (S32), it is examined whether or not the throttle aperture is larger than ⅓ of full throttle. If the answer is affirmative, the control proceeds to an engine brake control procedure which is described in FIG. 4(c). If the answer is negative, the control proceeds to step (S33). At step (S33), current acceleration of the vehicle is compared with 0.05G. If the acceleration is smaller than 0.05G, the control proceeds to the engine brake control procedure. If otherwise, the control unit judges that the vehicle is running down a slope and proceeds to step (S34) for performing an engine brake.

At step (S34), engine brake control procedure starts and proceeds to step (S35). At step (S35), actual engine speed is compared with a normal engine speed range. If the actual engine speed is within the normal engine speed range, the control proceeds to step (S36). If otherwise, the control proceeds to step (S37). At step (S36), CVT ratio is increased by an increment of Dr3 which is relatively large so as to increase swiftly the CVT Ratio. CVT Ratio indicates a transmission ratio of the stepless automatic transmission 1. At step (S37), Dr1 is subtracted from the CTV ratio, Dr1 being relatively small so as to decrease slowly the CVT Ratio.

The above-mentioned Dr1, Dr2 and Dr3 satisfy the following relation.

$$Dr1 < Dr2 < Dr3 \tag{1}$$

Determination of Objective Engine Speed

At step (S38), subsequent to step (S37), an objective engine speed TT-Ne is calculated and allocated according to the following equation.

$$TT\text{-}Ne = M * CVT\ Ratio * Sv \tag{2}$$

M : Transmission ratio from the engine to the drive wheel divided by the CVT Ratio
Sv: Speed of the vehicle
Because the above CVT Ratio has been obtained by subtracting Dr1 from the former value, TT-Ne corresponds to a transmission ratio which is slightly smaller than the current value. As a result, by virtue of steps (S37) and (S38), when the vehicle is running down a slope and the engine speed is higher than a normal range, transmission ratio is decreased so as to decrease the engine speed.

At step (S39), subsequent to step (S36), the objective engine speed TT-Ne is allocated according to a same procedure as above. But, because the current CVT Ratio is a result of the above mentioned summation of the former CVT Ratio and an increment Dr3, the objective Engine speed TT-Ne corresponds to a transmission ratio large enough to give a braking force to the vehicle by an engine brake. Subsequently at step 40, the objective engine speed TT-Ne is compared with the previous objective engine speed TT-Ne. If the former is smaller than the latter, TT-Ne is allocated as it is. If other wise, current TT-Ne is replaced by the previous value. According to the procedure, the objective engine speed TT-Ne does not exceed the objective engine speed set at step (39) for the first time.

When a throttle sensor is found to be invalid at steps (S11) and (S12), control proceeds from step (S12) to (S37) and the transmission ratio is slowly decreased.

(Engine Brake Control)

At step (S51), it is examined if the control is at an engine brake control status or not. If the answer is negative, the throttle aperture Ath is compared with the comparative throttle aperture RAth at step (S52). If the difference of Ath −RAth is larger than −Dth1, the control proceeds to step (S61), a kick-down control procedure. If no, the control proceeds to step (S53) for starting an engine brake control procedure.

Variables such as −Dth1, −Dth2, Dth1 and Dth2 have the following meanings and relations $$-Dth2 < -Dth1 < 0 < Dth1 < Dth2 \quad (3)$$

When the difference of the throttle aperture Ath and the comparative throttle aperture RAth, that is Dth, falls in one of the following ranges, it is judged that the operation of the throttle is as described as follows.

(a) Dth2 < Dth : throttle is opened very rapidly
(b) Dth1 < Dth < Dth2 : throttle is opened rapidly
(c) 0 < Dth < Dth1 : throttle is opened slowly
(d) −Dth1 < Dth < 0 : throttle is closed slowly
(e) −Dth2 < Dth < −Dth1 : throttle is closed rapidly
(f) Dth < −Dth2 : throttle is closed very rapidly Therefore, the control proceeds to the engine brake control, step (S53), when Dth falls in the range (e) or (f), that is when the throttle is closed rapidly or very rapidly.

Subsequently, at step (S54), the actual engine speed is compared with the normal engine speed range. If the engine speed is in the range, the control proceeds to the succeeding step (S55) for calculation of throttle aperture Ath subtracted by comparative throttle aperture RAth. If the actual engine speed is out of the range, the control jumps off step (S55) and proceeds to step (S56) for renewing the CVT Ratio, whereat former Dr1 is subtracted from the CTV Ratio. At step (S55), if the difference of Ath - RAth is larger than Dth2, the control proceeds to step (S56). Otherwise, the control proceeds to step (S57) for renewing the CVT Ratio by adding Dr3 thereto and proceeds to step (539).

If the situation is already under an engine brake control status at step (S51), the control proceeds to step (S58) for comparison of the final engine speed FT-Ne and the objective engine speed TT-Ne. If the final engine speed FT-Ne is larger than the objective engine speed TT-Ne, the control proceeds to step (S54) and follows the above-mentioned procedure. Otherwise, the control gets out of the engine brake control procedure (S59) and proceeds to the kick-down control procedure, that is, step (S61). If the difference of throttle aperture Ath and the comparative throttle aperture RAth is found to be equal to or larger than −Dth1 at step (S52), the control unit judges that the situation is to be controlled in the kick-down control procedure and proceeds to step (S61), also.

In the engine brake control procedure, the control proceeds to step (S56) for decreasing slightly the CVT Ratio in the condition that the throttle operation is in the range (e). When the throttle operation is in the range (f), the control proceeds to step (57) for increasing rapidly the transmission ratio so as to obtain a strong engine brake.

Kick-down Control Status

Kick-down control procedure includes the steps from (S61) to (S64). At step (S61), the throttle aperture Ath is compared with the comparative throttle aperture RAth. If the difference is equal to or larger than Dth2, that is, if the operation of throttle is in the above-mentioned range (a), the control proceeds to step (S63) for increasing the CVT Ratio by adding Dr3 to the former value for performing a rapid and large kick-down. If the difference of the throttle aperture Ath and the comparative throttle aperture RAth is smaller than Dth2, the difference is again compared with Dth1. If the difference is smaller than Dth1, the status is not to be controlled at the kick-down control procedure and proceeds to step (S71). Otherwise, the CTV Ratio is increased by adding Dr2 to the former value at step (S64) and further proceeds to step (S39). According to the kick-down control procedure, the control proceeds to step (S63) to very rapidly increase the CVT Ratio for a rapid acceleration in condition that the operation of the throttle is in the range (a). In condition that the operation of the throttle is in the range (b), the control proceeds to step (S64) for rapidly increasing the CVT Ratio.

Moderate Throttle Operation

The control arrives in the moderate throttle operation procedure in condition that the situation of the vehicle is neither in the engine brake control status nor in the kick-down control status. In other words, step (S71) starts when the operation of the throttle is in the ranges (c) and (d) that is a slow throttle operation.

At step (S71), final engine speed FT-Ne is compared with the objective engine speed TT-Ne. If the former is smaller than the latter, the control proceeds to step (S72) for renewing the CVT Ratio by subtracting Dr3 from the former value. Step (S72) corresponds to a slow acceleration status of the vehicle. Then, the control proceeds to step (S38) for allocating the objective engine speed. If the final engine speed FT-Ne is equal to or larger than the objective engine speed TT-Ne, the control proceeds to step (S73) and an increment Dr2 is added to the CVT Ratio to obtain a new CVT Ratio. Then, the control proceeds to step (S38) for allocating an objective engine speed TT-Ne. By virtue of the moderate throttle operation, the transmission ratio is slightly increased in a condition that the throttle is opened slowly. On the other hand, when the throttle is closed slowly, the transmission ratio is lowered slightly

Upper and Lower Limit of Engine Speed Compensation

Figures 1, 4D:
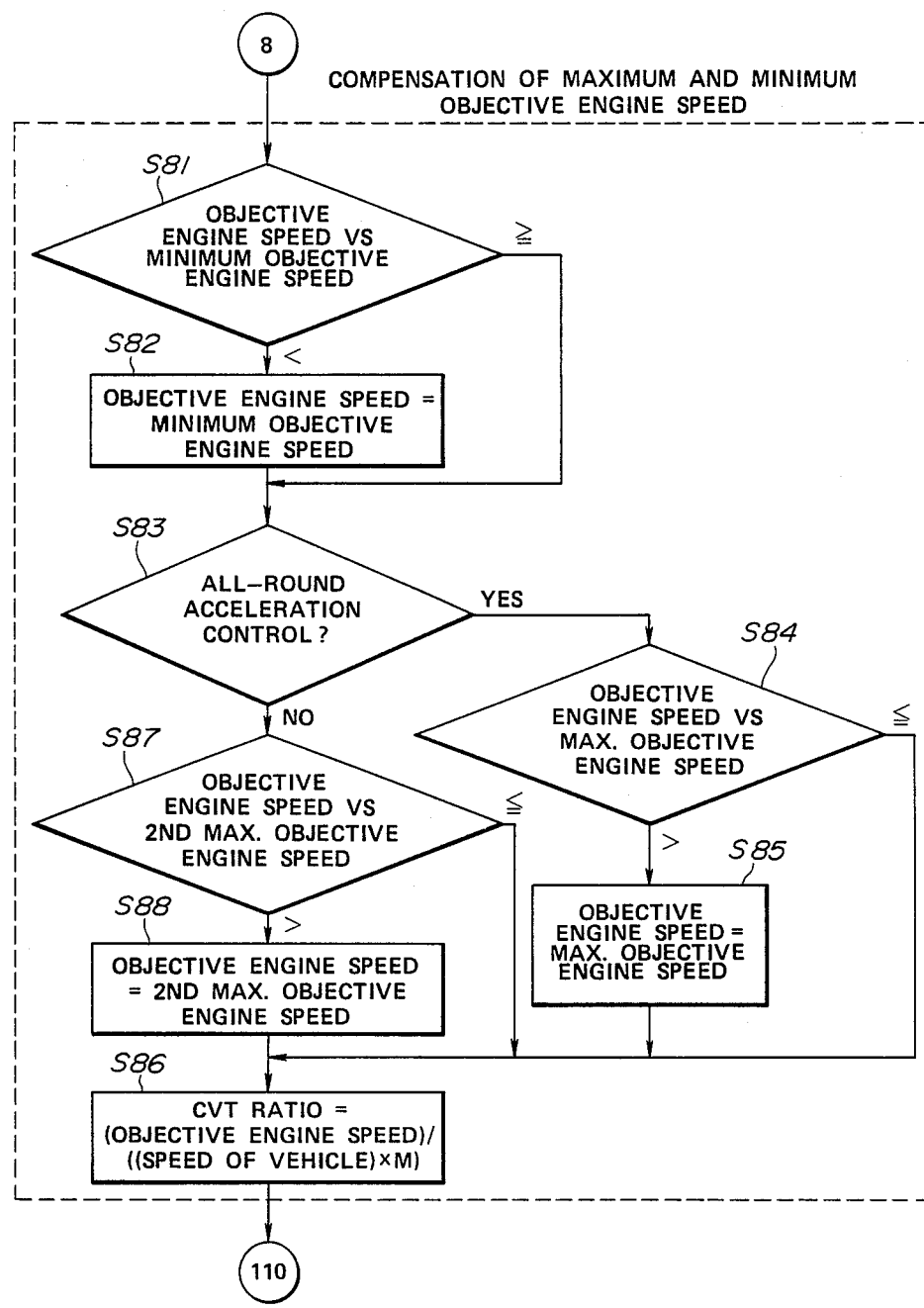
Figures 2, 4D:
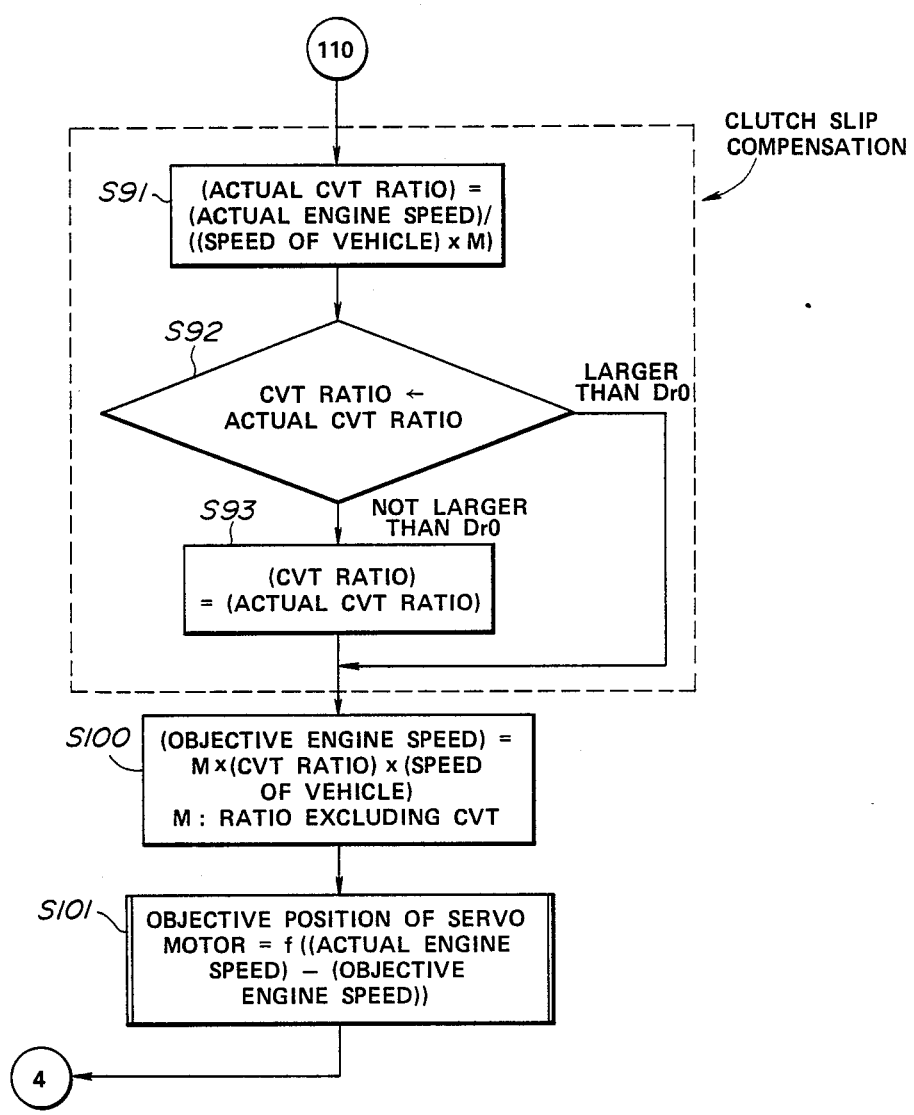

The upper and lower limit of engine speed compensation procedure, FIG. 4(d) proceeds from the steps (S38), (S40) or (S41). At step (S81), objective engine speed TT-Ne is compared with the lower limit of the objective engine speed shown in FIG. 10 for example. If the former is smaller than the latter, the objective engine speed TT-Ne is replaced by the lower limit at step (S82) so as to not allocate an engine speed lower than the lower limit, that is a lower limit compensation, and proceeds to step (83). Otherwise, the control jumps from step (S82) and proceeds to step (S83). At step (S83), it is judged whether or not the status of the vehicle is in the all-range acceleration control status. If the vehicle is in the all-range accelerate control status, the control proceeds to step (S84) whereat the objective engine speed is compared with the first upper limit of engine speed. If the objective engine speed TT-Ne exceeds the first upper limit of engine speed, the objective engine speed TT-Ne is replaced by the first upper limit at step (S84) and proceeds to step (S86). If the objective engine speed TT-Ne is not larger than the first upper limit of engine speed, the control jumps off step (S85), and proceeds also to step (S86). By steps (S84) and (S85), objective engine speed TT-Ne is guaranteed not to exceed the first upper limit, in condition that the vehicle is at the all-range acceleration control status.

If it is judged at step (S83) that the vehicle is not in the all-range acceleration control status, but in the normal acceleration control status, the control proceeds to step (S87) and the objective engine speed TT-Ne is compared with the second upper limit of engine speed. If the objective engine speed TT-Ne is higher than the second upper limit of the engine speed, the objective engine speed TT-Ne is replaced by the second upper limit of engine speed at step (S88) and proceeds to step (S86). Otherwise, the control jumps off the step (S88) and proceeds to step (S86). By virtue of steps (S88) and (S86), the objective engine speed TT-Ne is allocated not to exceed the second upper limit of engine speed in condition that the vehicle is not at the normal acceleration control status.

At step (S86), CVT Ratio is determined according to the following equation.

$$\text{CVT Ratio} = \text{TT-Ne}/(\text{Speed of vehicle} * M) \quad (4)$$

The CVT Ratio corresponds to the transmission ratio when the vehicle comes to the objective engine speed.

Clutch Slip Compensation

Succeeding to the upper and lower limit of engine speed compensation, the control comes into a clutch slip compensation procedure at step (S91).

At step (S91), actual CVT Ratio is calculated according to the following equation.

$$\text{Actual CVT Ratio} = \text{Actual Engine Speed Ne}/(\text{Speed of Vehicle} * M) \quad (5)$$

Next, at step (S92) the actual CVT Ratio is compared with the CVT Ratio that was calculated at step (S86). When a difference of CVT Ratio and the actual CVT Ratio is equal to or less than DrO, the control proceeds to step (S93) for replacing the CTV Ratio with the actual CVT Ratio and proceeds to step (S100). If the difference is larger than DrO, the control jumps from step (S93) and proceeds to step (S100). Thus the effect of slip at the clutch is taken into account in determining the transmission ratio.

Determination of Final Objective Engine Speed FT-Ne

At step (S100), the objective engine speed TT-Ne is calculated according to the following equation.

$$\text{TT-Ne} = M * \text{CVT Ratio} * \text{Speed of Vehicle} \quad (5)$$

At step (S101), the servo motor 57 is operated in order to set the engine speed to the above-mentioned objective engine speed TT-Ne. Rotational position of the servo motor is adjusted to the position defined as below.

$$Rs = f(Ne - \text{TT-Ne}) \quad (6)$$

f : function of the variables in parentheses
Rs : Rotational position of the servo motor
Ne : actual speed of engine The function f is determined according to the construction of the oil distributor 51, diameter of the control drum 56, etc. Thus, the transmission ratio is adjusted so that the engine speed Ne coincides with the objective engine speed TT-Ne.

The above mentioned control of the transmission ratio by the control unit 100 may be summarized as follows, with reference to FIG. 13, while the vehicle is at a normal driving condition. In the figure, the abscissa denotes time and ordinate denotes the throttle aperture. When the throttle aperture varies with respect to time as shown by FIG. 13 in a solid line A, the comparative throttle aperture RAth varies as shown by a dotted line B. The first and the second limit throttle apertures corresponding to the above-mentioned range (a) and (b) are shown by a two-dot chain line and a one-dot chain line respectively. The first and second limit throttle aperture corresponding to the range (e) and (f) are shown by two-dot chain line and a one-dot chain line respectively, also. The notion shown in parentheses denote the status of the vehicle as regards the throttle aperture. From left to right in the figure, during time interval denoted to (d), the transmission is increased or decreased slowly. In the time interval denoted with (b), the transmission ratio is increased rapidly as the throttle is opened rapidly. At the time interval denoted with (a), the transmission ratio is increased very rapidly as the throttle is opened very rapidly. In the 6th interval from left, the transmission ratio is decreased rapidly as the throttle is closed rapidly. In the 7th interval from left, the transmission ratio is decreased very rapidly as the throttle is closed very rapidly.

As the above-mentioned, apparatus and method for controlling the transmission ratio of a stepless automatic transmission takes into account a change with respect to time of the throttle aperture in determining an objective engine speed and adjusts the transmission ratio so that the engine speed coincides with the objective engine speed. Further, the apparatus and the method increases the transmission ratio rapidly when the throttle aperture is opened more rapidly than a prescribed value so as to realize a kick-down operation. On the contrary, the apparatus and the method decreases the transmission ratio rapidly when the throttle aperture is closed more rapidly than a prescribed ratio so as to realize an engine brake.

By virtue of the above-mentioned performance of the apparatus and the method of the present invention, a natural drivability of the vehicle is obtained.

What is claimed is:

1. An apparatus for controlling a stepless automatic transmission of a vehicle which comprises:
   (a) a throttle sensor for sensing a change with respect to time of a throttle aperture;
   (b) a first objective engine speed allocator for allocating an objective engine speed in a condition that the change with respect to time of the throttle aperture is within a prescribed range;
   (c) a second objective engine speed allocator for allocating an objective engine speed in a condition that the throttle aperture is opened more rapidly than a first prescribed value;
   (d) a third objective engine speed allocator for allocating an objective engine speed in a condition that the throttle aperture is closed more rapidly than a second prescribed value; and
   (e) a transmission controller for controlling an oil distributor to control a transmission ratio of the stepless automatic transmission so that an actual engine speed coincides with the objective engine speed.

2. An apparatus for controlling a stepless automatic transmission of a vehicle according to claim 1 which further comprises a control unit which;
   (c) calculates a comparative throttle aperture which varies with respect to time within a prescribed range of time increment so as to coincide with the throttle aperture while changes with respect to time of the latter is within a prescribed range and to deviate from the throttle aperture when changes with respect to time thereof exceeds the range;
   (b) select the first engine speed allocator in condition that the comparative throttle aperture coincides with the throttle aperture, the second engine speed allocator in condition that the throttle aperture is larger than the comparative throttle aperture, and the third engine speed allocator in condition that the throttle aperture is lower than the comparative throttle allocator, for allocating an objective engine speed.

3. A method for controlling a stepless automatic transmission of a vehicle, the method comprising the steps of:
   (a) calculating a comparative throttle aperture which is caused to vary with respect to time by the addition of a comparative throttle aperture increment to a preceding comparative throttle aperture, said comparative throttle aperture increment being based on the difference between said preceding comparative throttle aperture and an actual throttle aperture at a given point in time so that said comparative throttle aperture is caused to approach said actual throttle aperture, said comparative throttle aperture increment lying within a range of comparative throttle aperture increments;
   (b) calculating a change with respect to time of said actual throttle aperture based on the difference between said comparative throttle aperture determined in step (a) above and said actual throttle aperture when said comparative throttle aperture does not equal said actual throttle aperture;
   (c) determining an actual engine speed;
   (d) allocating an objective engine speed according to said change with respect to time of said actual throttle aperture; and
   (e) controlling an oil distributor to control a transmission ratio of the stepless automatic transmission so that an actual engine speed coincides with the objective engine speed.

4. A method for controlling a stepless automatic transmission of a vehicle according to claim 3, further comprising the step of:
   (f) causing said actual throttle aperture to change when said difference between said comparative throttle aperture and said actual throttle aperture at a given point in time lies outside of said range of comparative throttle aperture increments.

* * * * *

UNITED STATES PATENT AND TRADEMARK OFFICE
CERTIFICATE OF CORRECTION

PATENT NO. : 4,976,170

DATED : December 11, 1990

INVENTOR(S) : Hayashi et al.

It is certified that error appears in the above-identified patent and that said Letters Patent is hereby corrected as shown below: ON TITLE PAGE:

In the heading, line [73] after "Giken" insert -- Kogyo --.

Signed and Sealed this

Thirteenth Day of October, 1992

Attest:

DOUGLAS B. COMER

*Attesting Officer*      Acting Commissioner of Patents and Trademarks